US009722726B2

United States Patent
Kasher et al.

(10) Patent No.: US 9,722,726 B2
(45) Date of Patent: Aug. 1, 2017

(54) RECIPROCITY DETECTION AND UTILIZATION TECHNIQUES FOR BEAMFORMING TRAINING

(71) Applicants: Assaf Kasher, Haifa (IL); Yaniv Kaver, Givatayim (IL); Tom Harel, Shfaim (IL); Solomon Trainin, Haifa (IL)

(72) Inventors: Assaf Kasher, Haifa (IL); Yaniv Kaver, Givatayim (IL); Tom Harel, Shfaim (IL); Solomon Trainin, Haifa (IL)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/672,113

(22) Filed: Mar. 28, 2015

(65) Prior Publication Data
US 2016/0285583 A1    Sep. 29, 2016

(51) Int. Cl.
*H04B 17/00* (2015.01)
*H04L 1/00* (2006.01)
*H04B 7/06* (2006.01)
*H04B 7/08* (2006.01)

(52) U.S. Cl.
CPC ......... *H04L 1/0001* (2013.01); *H04B 7/0695* (2013.01); *H04B 7/088* (2013.01); *H04B 17/00* (2013.01)

(58) Field of Classification Search
CPC .............................. H04L 1/0001; H04B 17/00
USPC ........................................................ 455/67.11
See application file for complete search history.

(56) References Cited

U.S. PATENT DOCUMENTS

| 2010/0214169 A1* | 8/2010 | Kafle ....................... H01Q 3/26 342/368 |
| 2010/0215027 A1 | 8/2010 | Liu et al. |
| 2014/0018005 A1* | 1/2014 | Sofer ................... H04B 7/0608 455/63.4 |

OTHER PUBLICATIONS

International Search Report and Written Opinion received for PCT Patent Application No. PCT/US2016/024565, mailed Jun. 8, 2016, 14 pages.

* cited by examiner

*Primary Examiner* — Ankur Jain

(57) ABSTRACT

Reciprocity detection and utilization techniques for beamforming training are described. In one embodiment, for example, an apparatus may comprise a station (STA) comprising logic, at least a portion of which is in hardware, the logic to perform an initiator transmit sector sweep (TXSS) to select an initiator transmit (TX) sector, perform a beamforming reciprocity test using the selected initiator TX sector, and determine whether to perform directional reception using a reciprocal initiator receive (RX) sector for the initiator TX sector based on an outcome of the beamforming reciprocity test. Other embodiments are described and claimed.

14 Claims, 12 Drawing Sheets

*FIG. 9*

_Storage Medium 900_

*Computer Executable Instructions for 700*

*Computer Executable Instructions for 800*

RECIPROCITY DETECTION AND UTILIZATION TECHNIQUES FOR BEAMFORMING TRAINING

TECHNICAL FIELD

Embodiments described herein generally relate to wireless communications between devices in wireless networks.

BACKGROUND

The 60 GHz wireless communication frequency band offers substantial promise for use in accommodating the ever-growing data-rate demands of wireless communications devices and their users. The 60 GHz band contains a large amount of available bandwidth, the physical properties of signals with frequencies in the 60 GHz band render them well-suited for use in directional transmission and reception in conjunction with the application of spatial multiplexing techniques. When two 60 GHz-capable devices initially establish a connection with each other, they may perform a beamforming training procedure in order to identify the respective directions in which they should transmit and the respective directions from which they should receive. In many typical scenarios in which there is an unobstructed direct path between the two 60 GHz-capable devices, each device's optimal transmit direction may be the same as its optimal receive direction—namely the direction of the unobstructed path to the other device. In some cases, however, the device's optimal transmit directions may differ from their optimal receive directions.

BRIEF DESCRIPTION OF THE DRAWINGS

FIG. 9 illustrates an embodiment of a storage medium.

DETAILED DESCRIPTION

Figure 1:
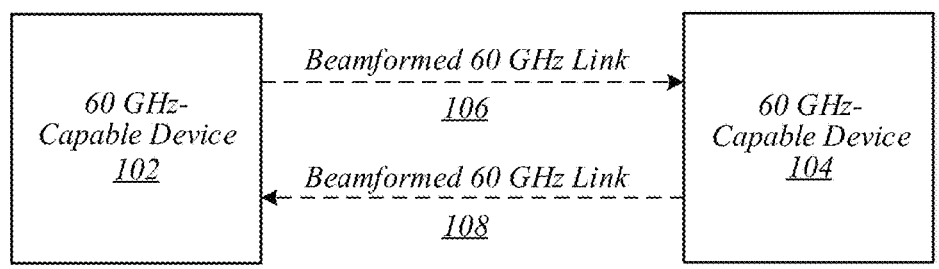
FIG. 1 illustrates an embodiment of a first operating environment.

Various embodiments may be generally directed to reciprocity detection and utilization techniques for beamforming training. In one embodiment, for example, an apparatus may comprise a station (STA) comprising logic, at least a portion of which is in hardware, the logic to perform an initiator transmit sector sweep (TXSS) to select an initiator transmit (TX) sector, perform a beamforming reciprocity test using the selected initiator TX sector, and determine whether to perform directional reception using a reciprocal initiator receive (RX) sector for the initiator TX sector based on an outcome of the beamforming reciprocity test. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Various embodiments herein are generally directed to wireless communications systems. Some embodiments are particularly directed to wireless communications over 60 GHz frequencies. Various such embodiments may involve wireless communications performed according to one or more standards for 60 GHz wireless communications. For example, some embodiments may involve wireless communications performed according to one or more Wireless Gigabit Alliance ("WiGig")/Institute of Electrical and Electronics Engineers (IEEE) 802.11ad standards, such as IEEE 802.11ad-2012, including their predecessors, revisions, progeny, and/or variants. Various embodiments may involve wireless communications performed according to one or more "next-generation" 60 GHz ("NG60") wireless local area network (WLAN) communications standards. Some embodiments may involve wireless communications performed according to one or more millimeter-wave (mm-Wave) wireless communication standards. It is worthy of note that the term "60 GHz," as it is employed in reference to various wireless communications devices, wireless communications frequencies, and wireless communications standards herein, is not intended to specifically denote a frequency of exactly 60 GHz, but rather is intended to generally refer to frequencies in, or near, the 57 GHz to 64 GHz frequency band or any nearby unlicensed band. The embodiments are not limited in this context.

Various embodiments may additionally or alternatively involve wireless communications according to one or more other wireless communication standards. Some embodiments may involve wireless communications performed according to one or more broadband wireless communication standards. For example, various embodiments may involve wireless communications performed according to one or more 3rd Generation Partnership Project (3GPP), 3GPP Long Term Evolution (LTE), and/or 3GPP LTE-Advanced (LTE-A) technologies and/or standards, including their predecessors, revisions, progeny, and/or variants. Additional examples of broadband wireless communication technologies/standards that may be utilized in some embodiments may include—without limitation—Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS), IEEE 802.16 wireless broadband standards such as IEEE 802.16m and/or IEEE 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their predecessors, revisions, progeny, and/or variants.

Further examples of wireless communications technologies and/or standards that may be used in various embodiments may include—without limitation—other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11af, and/or IEEE 802.11ah standards, High-Efficiency Wi-Fi standards developed by the IEEE 802.11 High Efficiency WLAN (HEW) Study Group and/or IEEE 802.11 Task Group (TG) ax, Wi-Fi Alliance (WFA) wireless communication standards such as Wi-Fi, Wi-Fi Direct, Wi-Fi Direct Services, WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any predecessors, revisions, progeny, and/or variants of any of the above. The embodiments are not limited to these examples.

FIG. 1 illustrates an example of an operating environment 100 that may be representative of various embodiments. In operating environment 100, 60 GHz-capable devices 102 and 104 communicate with each other over beamformed 60 GHz links 106 and 108. 60 GHz-capable device 102 sends data to 60 GHz-capable device 104 over beamformed 60 GHz link 106, and receives data from 60 GHz-capable device 104 via beamformed 60 GHz link 108. Likewise, 60 GHz-capable device 104 sends data to 60 GHz-capable device 102 over beamformed 60 GHz link 108, and receives data from 60 GHz-capable device 102 via beamformed 60 GHz link 106. In some embodiments, 60 GHz-capable devices 102 and 104 may comprise wireless communication devices in a wireless network that utilizes wireless channel frequencies of the 60 GHz band. In various embodiments, 60 GHz-capable devices 102 and 104 may communicate with each other according to one or more standards for 60 GHz wireless communications. For example, in some embodiments, 60 GHz-capable devices 102 and 104 may communicate with each other according to one or more protocols and/or procedures defined in IEEE 802.11ad-2012, and/or its predecessors, revisions, progeny, and/or variants. In various such embodiments, 60 GHz-capable devices 102 and 104 may comprise 60 GHz-capable stations (STAs) such as Directional Multi-Gigabit (DMG) stations (STAs). In some such embodiments, one of 60 GHz-capable devices 102 and 104 may operate as a personal basic service set (PBSS) control point/access point (PCP/AP). The embodiments are not limited to these examples.

In some embodiments, 60 GHz-capable devices 102 and 104 may possess directional transmission and reception capabilities, and the exchange of data over beamformed 60 GHz links 106 and 108 may involve directional transmission and reception of signals. In various embodiments, each directional transmission may be directed towards a selected one of a plurality of transmit (TX) sectors of the transmitting device. In some embodiments, each directional reception may be performed by focusing a receive beam of the receiving device towards a selected one of a plurality of receive (RX) sectors of the receiving device. In various embodiments, 60 GHz-capable device 102 may send data over beamformed 60 GHz link 106 by transmitting signals comprising that data towards a selected TX sector. In some embodiments, 60 GHz-capable device 104 may receive data over beamformed 60 GHz link 106 by receiving signals comprising that data while focusing its receive beam towards a selected RX sector. In various embodiments, 60 GHz-capable device 104 may send data over beamformed 60 GHz link 108 by transmitting signals comprising that data towards a selected TX sector. In some embodiments, 60 GHz-capable device 102 may receive data over beamformed 60 GHz link 108 by receiving signals comprising that data while focusing its receive beam towards a selected RX sector. The embodiments are not limited in this context.

In various embodiments, the quality with which one of 60 GHz-capable devices 102 and 104 receives a signal transmitted by the other may depend greatly on the TX sector used to transmit the signal and the RX sector used to receive the signal. If a TX sector is selected that results in the signal reaching the receiver with a high level of quality, and an RX sector is selected such that the receiver's receive beam is oriented towards the incoming signal, the receiver may receive the signal with a high level of quality, resulting in a high link quality with respect to the associated beamformed 60 GHz link. On the other hand, if a TX sector is selected that results in the signal reaching the receiver with a low level of quality, and/or an RX sector is selected such that the receiver's receive beam is oriented away from the incoming signal, the receiver may receive the signal with a low level of quality, resulting in a low link quality with respect to the associated beamformed 60 GHz link. In some embodiments, in order to select TX and RX sectors to optimize link qualities of beamformed 60 GHz links 106 and 108, 60 GHz-capable devices 102 and 104 may perform a beamforming training procedure. The device that initiates such a beamforming training procedure may be referred to as the "initiator," and the other participating device may be referred to as the "responder."

Figure 2A:
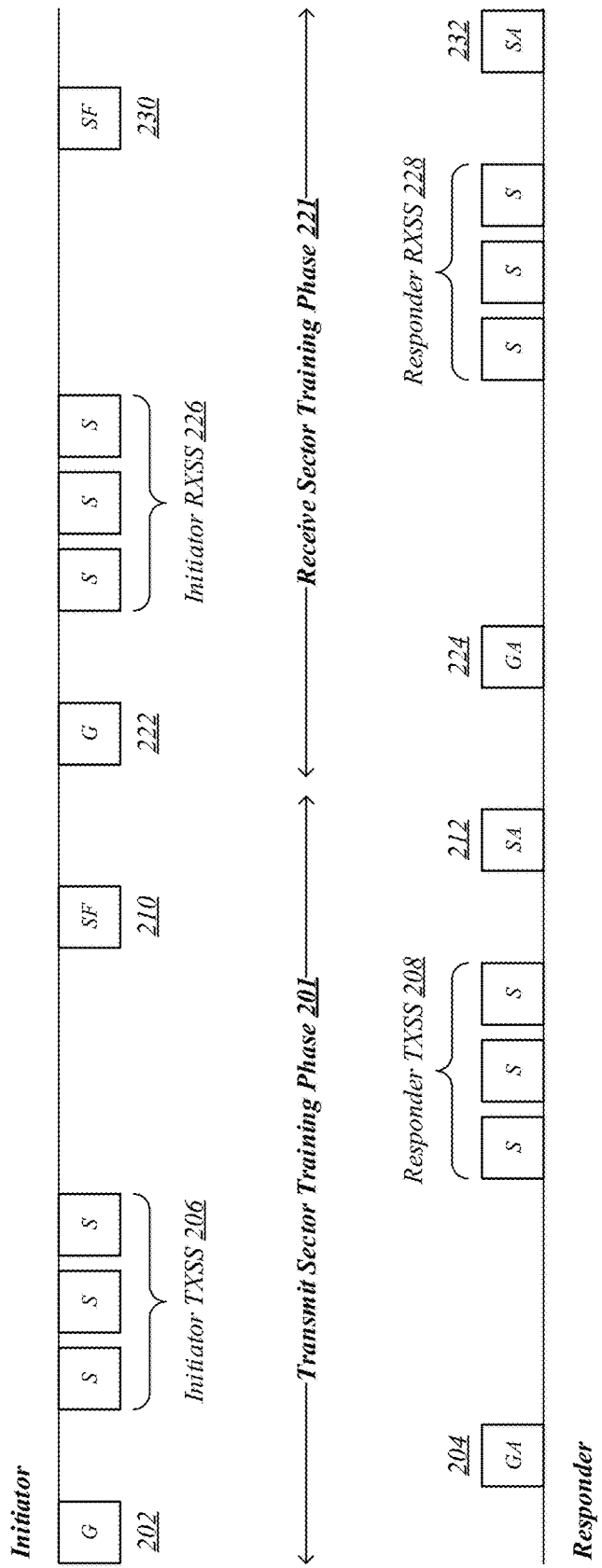
FIG. 2A illustrates an embodiment of a first communications flow.

FIG. 2A illustrates an example of a communications flow 200 that may be representative of a beamforming training procedure that 60 GHz-capable devices 102 and 104 may perform in various embodiments in order to identify best TX and RX sectors to optimize link qualities of beamformed 60 GHz links 106 and 108. In communications flow 200, an initiator and a responder exchange communications in order to train an initiator-responder link and a responder-initiator link. In some embodiments, 60 GHz-capable device 102 may act as the initiator and 60 GHz-capable device 104 may act as the responder, and thus beamformed 60 GHz link 106 may comprise the initiator-responder link and beamformed 60 GHz link 108 may comprise the responder-initiator link. In various other embodiments, 60 GHz-capable device 104 may act as the initiator and 60 GHz-capable device 102 may act as the responder, and thus beamformed 60 GHz link 108 may comprise the initiator-responder link and beamformed 60 GHz link 106 may comprise the responder-initiator link. The embodiments are not limited in this context.

As shown in FIG. 2A, in some embodiments, communications flow 200 may comprise a transmit sector training phase 201 and a receive sector training phase 221. In various embodiments, based on communications exchanged during transmit sector training phase 201, the initiator may select an initiator TX sector and the responder may select a responder TX sector. In some embodiments, based on communications exchanged during receive sector training phase 221, the initiator may select an initiator RX sector, and the responder may select a responder RX sector.

As shown in FIG. 2A, in various embodiments, transmit sector training phase 201 may begin with the initiator sending a grant (G) frame 202, to which the responder may reply by sending a grant acknowledgment (GA) frame 204. In some embodiments, following receipt of grant acknowledgment frame 204, the initiator may send a series of sector sweep (S) frames during an initiator transmit sector sweep (TXSS) 206. In various embodiments, the initiator and the responder may not exchange grant frame 202 and grant acknowledgment frame 204, and transmit sector training phase 201 may begin with the initiator TXSS 206. In some embodiments, during the initiator TXSS 206, the initiator may transmit a plurality of sector sweep frames, each using a respective one of a plurality of initiator transmit (TX) sectors. In various embodiments, each such sector sweep frame may contain a sector identifier (ID) for the initiator TX sector from which it is transmitted. In some embodiments, the responder may listen for the transmitted sector sweep frames using an omnidirectional or quasi-omnidirectional receive antenna configuration, and may measure a respective level of quality with which it receives each sector sweep frame that it successfully receives. In some embodiments, for example, the responder may measure a respective signal-to-noise ratio (SNR) with which it receives each sector sweep frame that it successfully receives. In various embodiments, the responder may identify a sector sweep frame received with a highest level of quality, and identify an initiator TX sector associated with the sector ID comprised in that sector sweep frame as a best initiator TX sector.

In some embodiments, following initiator TXSS 206, the responder may send a series of sector sweep frames during a responder TXSS 208. In various embodiments, during the responder TXSS 208, the responder may transmit a plurality of sector sweep frames, each using a respective one of a plurality of responder TX sectors. In some embodiments, each such sector sweep frame may contain a sector ID for the responder TX sector from which it is transmitted. In various embodiments, each such sector sweep frame may also contain the sector ID for the best initiator TX sector, as well as the level of quality with which the sector sweep frame comprising that sector ID was received at the responder. In some embodiments, the initiator may listen for the transmitted sector sweep frames using an omnidirectional or quasi-omnidirectional receive antenna configuration, and may measure a respective level of quality with which it receives each sector sweep frame that it successfully receives. In some embodiments, for example, the initiator may measure a respective SNR with which it receives each sector sweep frame that it successfully receives. In various embodiments, the initiator may identify its best TX sector, and its corresponding level of quality, by retrieving those parameters from any such successfully received sector sweep frame. In some embodiments, the initiator may identify a sector sweep frame received with a highest level of quality, and identify a responder TX sector associated with the sector ID comprised in that sector sweep frame as a best responder TX sector.

In various embodiments, following responder TXSS 208, the initiator may send a sector sweep feedback (SF) frame 210. In some embodiments, the sector sweep feedback frame 210 may contain the sector ID for the best responder TX sector, as well as an indication of the level of quality with which the sector sweep frame comprising that sector ID was received at the initiator. In various embodiments, the responder may identify its best TX sector, and its corresponding level of quality, by retrieving those parameters from sector sweep feedback frame 210. In some embodiments, transmit sector training phase 201 may conclude with the responder sending a sector sweep acknowledgment (SA) frame 212 to acknowledge receipt of sector sweep feedback frame 210.

In various embodiments, receive sector training phase 221 may begin with the initiator sending a grant frame 222, to which the responder may reply by sending a grant acknowledgment frame 224. In various embodiments, following receipt of grant acknowledgment frame 224, the initiator may send a series of sector sweep frames during an initiator receive sector sweep (RXSS) 226. In some embodiments, the initiator and the responder may not exchange grant frame 222 and grant acknowledgment frame 224, and receive sector training phase 221 may begin with the initiator RXSS 226. In various embodiments, during the initiator RXSS 226, the initiator may transmit a plurality of sector sweep frames, each using the best initiator TX sector identified during transmit sector training phase 201. In some embodiments, the responder may monitor a different respective receive (RX) sector during the transmission of each such sector sweep frame, and may measure a respective level of quality with which it receives each sector sweep frame that it successfully receives. In various embodiments, the responder may identify a sector sweep frame received with a highest level of quality, and identify a responder RX sector being monitored at the time of receipt of that sector sweep frame as a best responder RX sector.

In some embodiments, following initiator RXSS 226, the responder may send a series of sector sweep frames during a responder RXSS 228. In various embodiments, during the responder RXSS 228, the responder may transmit a plurality of sector sweep frames, each using the best responder TX sector identified during transmit sector training phase 201. In some embodiments, each such sector sweep frame may indicate the level of quality corresponding to the best responder RX sector as determined during initiator RXSS 226. In various embodiments, the initiator may monitor a different respective RX sector during the transmission of each such sector sweep frame, and may measure a respective level of quality with which it receives each sector sweep frame that it successfully receives. In some embodiments, the initiator may identify a sector sweep frame received with a highest level of quality, and identify an initiator RX sector being monitored at the time of receipt of that sector sweep frame as a best initiator RX sector. In various embodiments, following responder RXSS 228, the initiator may send a sector sweep feedback frame 230. In some embodiments, the sector sweep feedback frame 230 may indicate the level of quality corresponding to the best initiator RX sector as determined during responder RXSS 228. In some embodiments, the responder may reply to sector sweep feedback frame 230 by sending a sector sweep acknowledgment frame 232. The embodiments are not limited in this context.

Figure 2B:
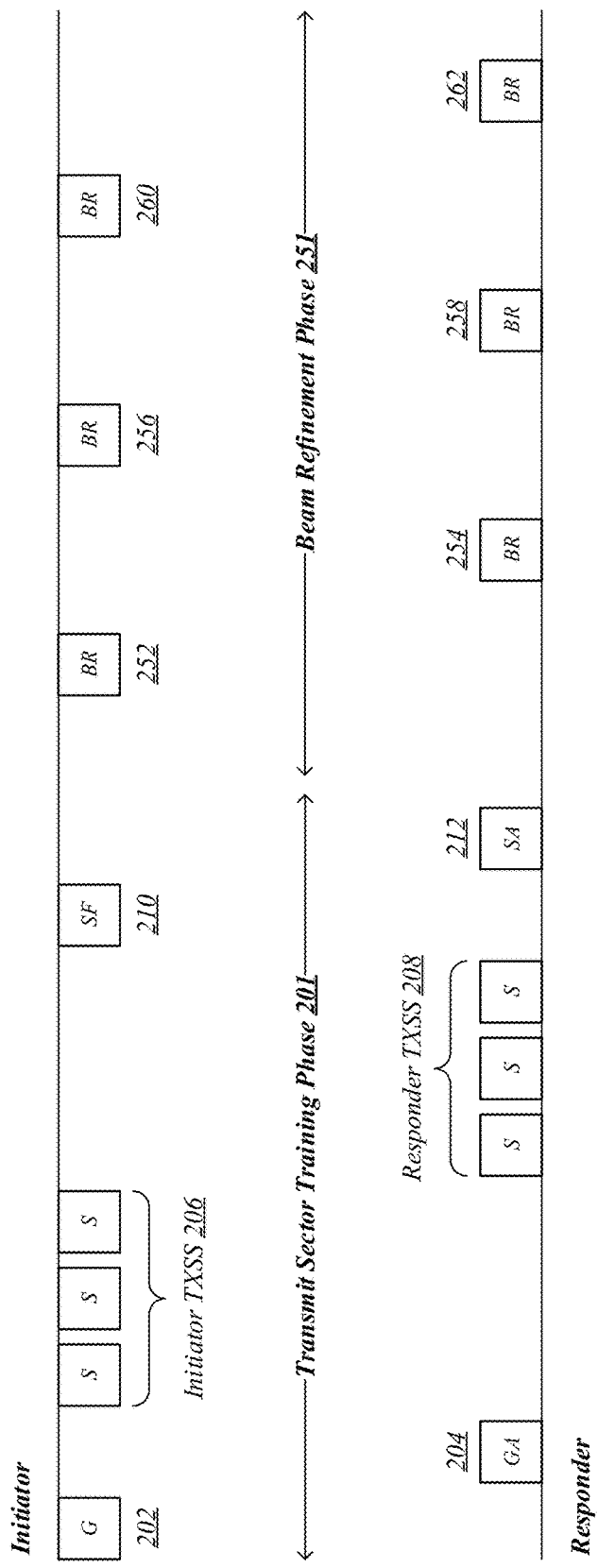
FIG. 2B illustrates an embodiment of a second communications flow.

FIG. 2B illustrates a communications flow 250 that may be representative of another beamforming training procedure that 60 GHz-capable devices 102 and 104 may perform in various embodiments in order to identify best TX and RX sectors to optimize link qualities of beamformed 60 GHz links 106 and 108. In communications flow 250, receive sector training phase 221 of FIG. 2A is replaced with a beam refinement phase 251. Beam refinement phase 251 may generally comprise an iterative process, during which the initiator and the responder may exchange a series of beam refinement frames in order to identify best initiator and responder RX sectors. In the example of FIG. 2A, the initiator and responder exchange beam refinement (BR) frames 252, 254, 256, 258, 260, and 262 during beam refinement phase 251. In various embodiments, the initiator and responder may use the various beam refinement frames 252, 254, 256, 258, 260, and 262 to request beam refinement receive training from each other and to provide beam refinement receive training to each other in response to such requests. The embodiments are not limited to this example.

In some embodiments, it may commonly be the case that the best initiator TX sector corresponds substantially to a same direction as the best initiator RX sector, and that the best responder TX sector corresponds substantially to a same direction as the best responder RX sector. With respect to beamforming training procedures such as those depicted in FIGS. 2A and 2B, it may thus commonly be the case that the initiator and responder RX sectors selected via receive sector training phase 221 or beam refinement phase 251 are initiator and responder RX sectors corresponding substantially to the same respective directions as the initiator and responder TX sectors selected via transmit sector training phase 201. In various embodiments, such a condition may reflect a scenario in which an optimal path for transmissions from the initiator to the responder is substantially the same as an optimal path for transmissions from the responder to the initiator. Hereinafter, the term "beamforming reciprocity" shall be employed to denote a condition according to which the best initiator TX and RX sectors correspond substantially to a same direction and the best responder TX and RX sectors correspond substantially to a same direction. The term "reciprocal RX sector" shall be employed to denote—with respect to a TX sector of a given device—an RX sector of that device that corresponds substantially to a same direction as that TX sector. Likewise, the term "reciprocal TX sector" shall be employed to denote—with respect to an RX sector of a given device—a TX sector of that device that corresponds substantially to a same direction as that RX sector.

Figure 3:
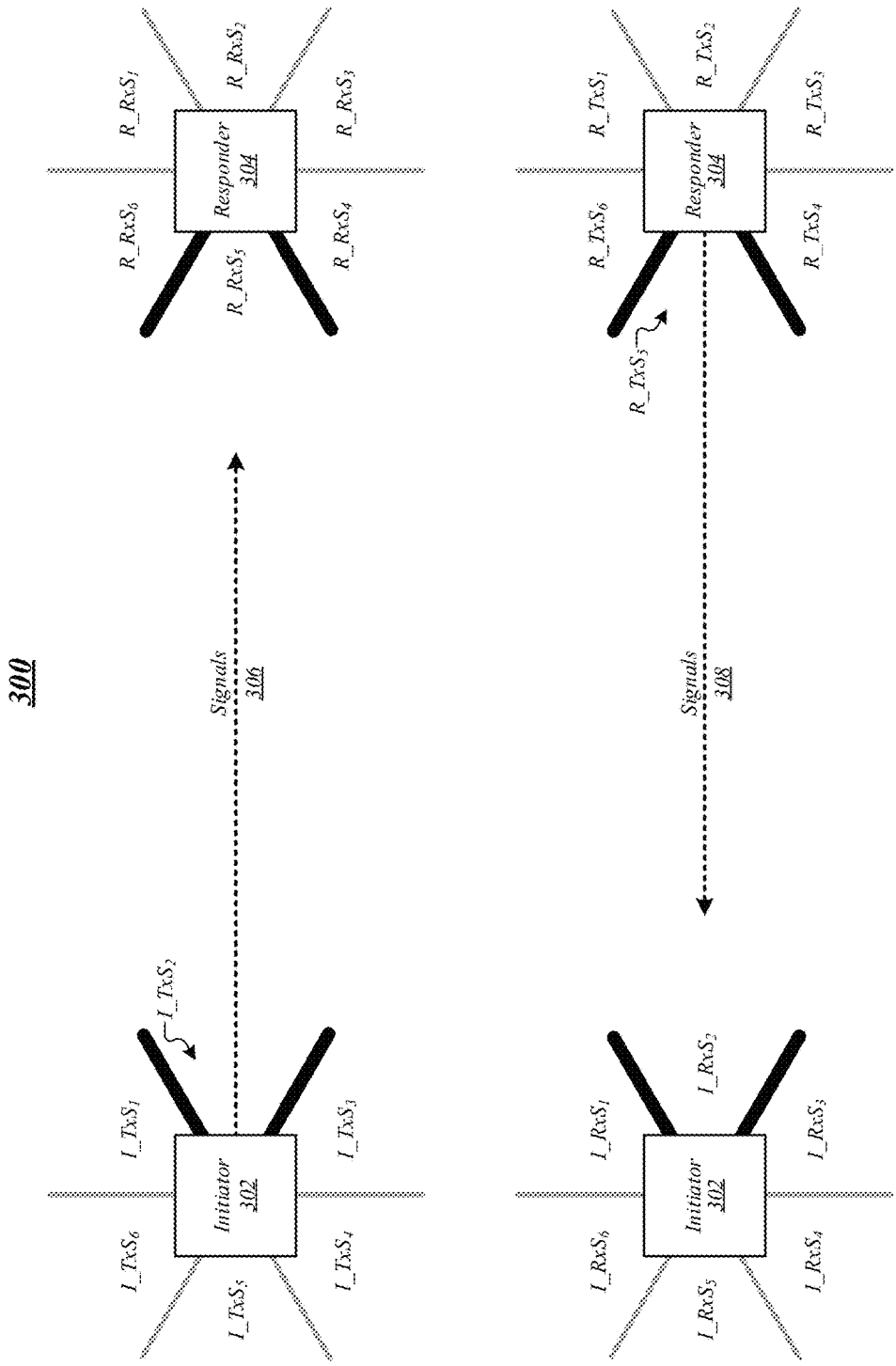
FIG. 3 illustrates an embodiment of a second operating environment.

FIG. 3 illustrates an example of an operating environment 300 that may be representative of beamforming reciprocity. In operating environment 300, an initiator 302 transmits signals 306 comprising data for a responder 304, and the responder 304 transmits signals 308 comprising data for the initiator 302. Initiator 302 directionally transmits signals 306 towards a selected one of its six TX sectors I_TxS$_1$-I_TxS$_6$, and directionally receives signals 308 by directing its receive beam towards a selected one of its six RX sectors I_RxS$_1$-I_RxS$_6$. Likewise, responder 304 directionally transmits signals 308 towards a selected one of its six TX sectors R_TxS$_1$-R_TxS$_6$, and directionally receives signals 306 by directing its receive beam towards a selected one of its six RX sectors R_RxS$_1$-R_RxS$_6$. It is worthy of note that initiator 302 and/or responder 304 may have greater or lesser numbers of TX and/or RX sectors in some embodiments, and that the embodiments are not limited to this example.

In operating environment 300, the direct path between initiator 302 and responder 304 is unobstructed. Because this direct path is unobstructed, signals 306 may reach responder 304 with a highest level of energy if initiator 302 transmits them towards an initiator TX sector—I_TxS$_2$—that generally corresponds to the direct path, and responder 304 may receive signals 306 with a highest level of received power if it receives them via a responder RX sector—R_RxS$_5$—that generally corresponds to the direct path.

Thus, sector I_TxS$_2$ may comprise the best initiator TX sector, and sector R_RxS$_5$ may comprise the best responder RX sector. Likewise, signals 308 may reach initiator 302 with a highest level of energy if responder 304 transmits them towards a responder TX sector—R_TxS$_5$—that generally corresponds to the direct path, and initiator 302 may receive signals 308 with a highest level of received power if it receives them via an initiator RX sector—I_RxS$_2$—that generally corresponds to the direct path. Thus, sector R_TxS$_5$ may comprise the best responder TX sector, and sector I_RxS$_2$ may comprise the best initiator RX sector. Initiator RX sector I_RxS$_2$ corresponds to substantially the same direction as initiator TX sector I_TxS$_2$, and responder TX sector R_TxS$_5$ corresponds to substantially the same direction as responder RX sector R_RxS$_5$. As such, the best TX and RX sectors of initiator 302 may correspond substantially to a same direction, and the best TX and RX sectors of responder 304 may also correspond substantially to a same direction. Therefore, beamforming reciprocity may exist in operating environment 300. The embodiments are not limited to this example.

Referring back to FIGS. 2A and 2B, in various embodiments in which beamforming reciprocity exists, the initiator and the responder may be able to correctly select their respective best RX sectors autonomously, without need for receive sector training phase 221 or beam refinement phase 251. More particularly, assuming that beamforming reciprocity exists, the initiator may correctly select its best RX sector as that corresponding substantially to the best initiator TX sector as identified during transmit sector training phase 201, and the responder may correctly select its best RX sector as that corresponding substantially to the best responder TX sector as identified during transmit sector training phase 201. As such, in the presence of beamforming reciprocity, it may be desirable for the initiator and responder to skip receive sector training phase 221 or beam refinement phase 251. However, at the time of completion of transmit sector training phase 201, the initiator and responder may have no way of knowing whether beamforming reciprocity actually exists. Furthermore, although beamforming reciprocity may be a common scenario, it may be undesirable for the initiator and responder to assume beamforming reciprocity, because this assumption may result in low link quality or link failure in the event that it is incorrect.

Figure 4:
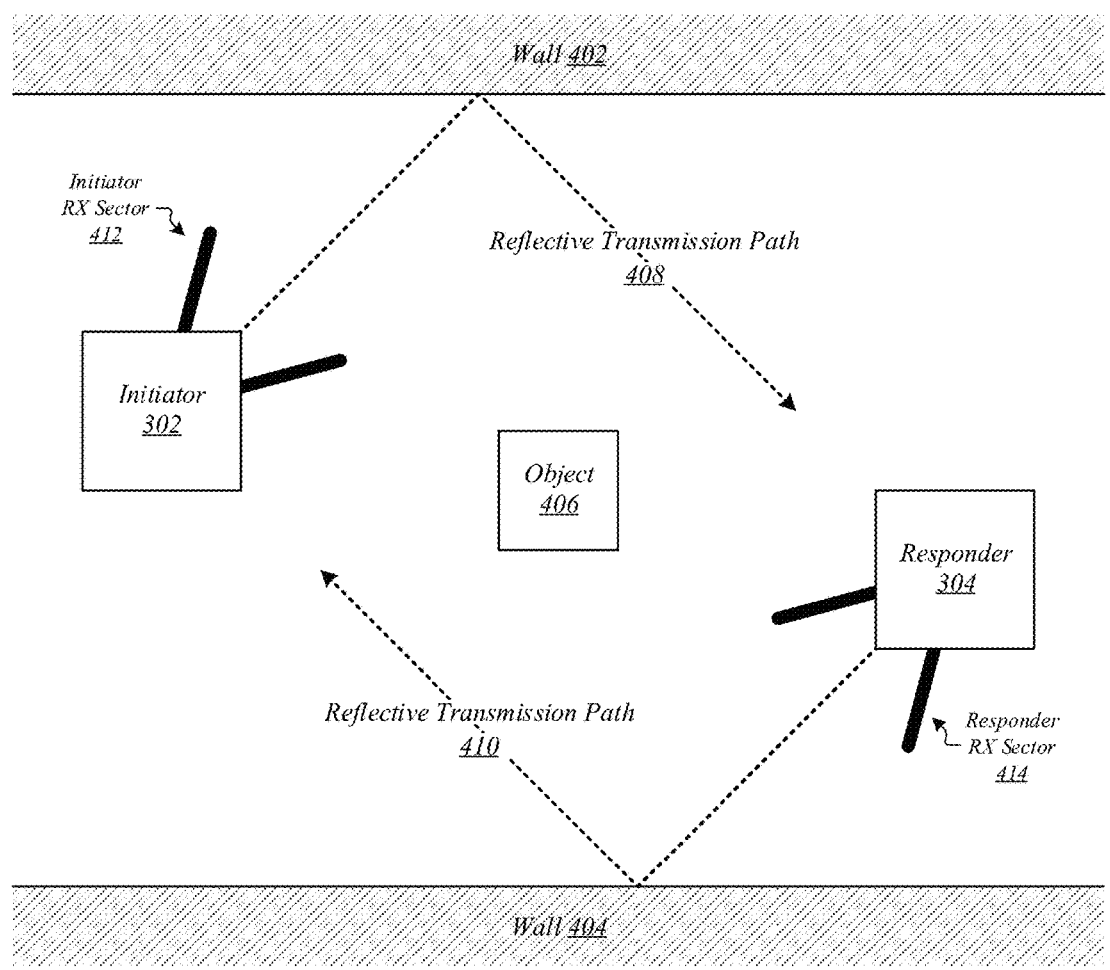
FIG. 4 illustrates an embodiment of a third operating environment.

FIG. 4 illustrates an operating environment 400 that may comprise a representative example of a scenario in which an incorrect assumption of beamforming reciprocity may result in low link quality or link failure. In operating environment 400, initiator 302 and responder 304 are positioned between walls 402 and 404. The direct path between initiator 302 and responder 304 is obstructed by an object 406. As a result, a transmission from one may reach the other with a higher level of energy if it traverses a reflective path rather than the direct path. The initiator 302 and responder 304 have selected their respective TX sectors by performing transmit sector training, such as that exemplified by transmit sector training phase 201 of FIGS. 2A and 2B. Initiator 302 has selected an initiator TX sector (not shown in FIG. 4) that substantially corresponds to a reflective transmission path 408, which makes use of reflection off of wall 402. Responder 304 has selected a responder TX sector (not shown in FIG. 4) that substantially corresponds to a reflective transmission path 410, which makes use of reflection off of wall 404.

In operating environment 400, signals that initiator 302 transmits along reflective transmission path 408 arrive at responder 304 from a substantially different direction than that in which responder 304 transmits signals along reflective transmission path 410. Accordingly, the actual best RX sector for responder 304 may correspond to a substantially different direction than the best TX sector for responder 304. Likewise, signals that responder 304 transmits along reflective transmission path 410 arrive at initiator 302 from a substantially different direction than that in which initiator 302 transmits signals along reflective transmission path 408. Accordingly, the actual best RX sector for initiator 302 may correspond to a substantially different direction than the best TX sector for initiator 302. As such, beamforming reciprocity may not exist in operating environment 400.

If initiator 302 assumes beamforming reciprocity, it may select an initiator RX sector 412 that generally focuses its receive beam in substantially the same direction as that of outgoing reflective transmission path 408, and thus away from the direction of incoming reflective transmission path 410. This may significantly reduce the power—if any—with which initiator 302 is able to receive transmissions from responder 304, and may result in low responder-initiator link quality or failure of the responder-initiator link. Likewise, if responder 304 assumes beamforming reciprocity, it may select a responder RX sector 414 that generally focuses its receive beam in substantially the same direction as that of outgoing reflective transmission path 410, and thus away from the direction of incoming reflective transmission path 408. This may significantly reduce the power—if any—with which responder 304 is able to receive transmissions from initiator 302, and may result in low initiator-responder link quality or failure of the initiator-responder link. The embodiments are not limited to this example.

Disclosed herein are reciprocity detection and utilization techniques for beamforming training. According to some such techniques, an enhanced beamforming training protocol may be implemented to enable wireless devices to perform beamforming training more efficiently in the presence of beamforming reciprocity without sacrificing their ability to optimize link qualities in the absence of beamforming reciprocity. In various embodiments, once an initiator and a responder have selected their respective TX sectors, they may perform a beamforming reciprocity test in order to determine whether beamforming reciprocity is present. In some embodiments, the beamforming reciprocity test may comprise a four-way handshake. In various embodiments, in response to a determination that beamforming reciprocity is present, the initiator and responder may select RX sectors that substantially correspond to same directions as their respective TX sectors. In some embodiments, in response to a determination that beamforming reciprocity is not present, the initiator and responder may perform additional beamforming training in order to select their respective RX sectors. The embodiments are not limited in this context.

Figure 5:
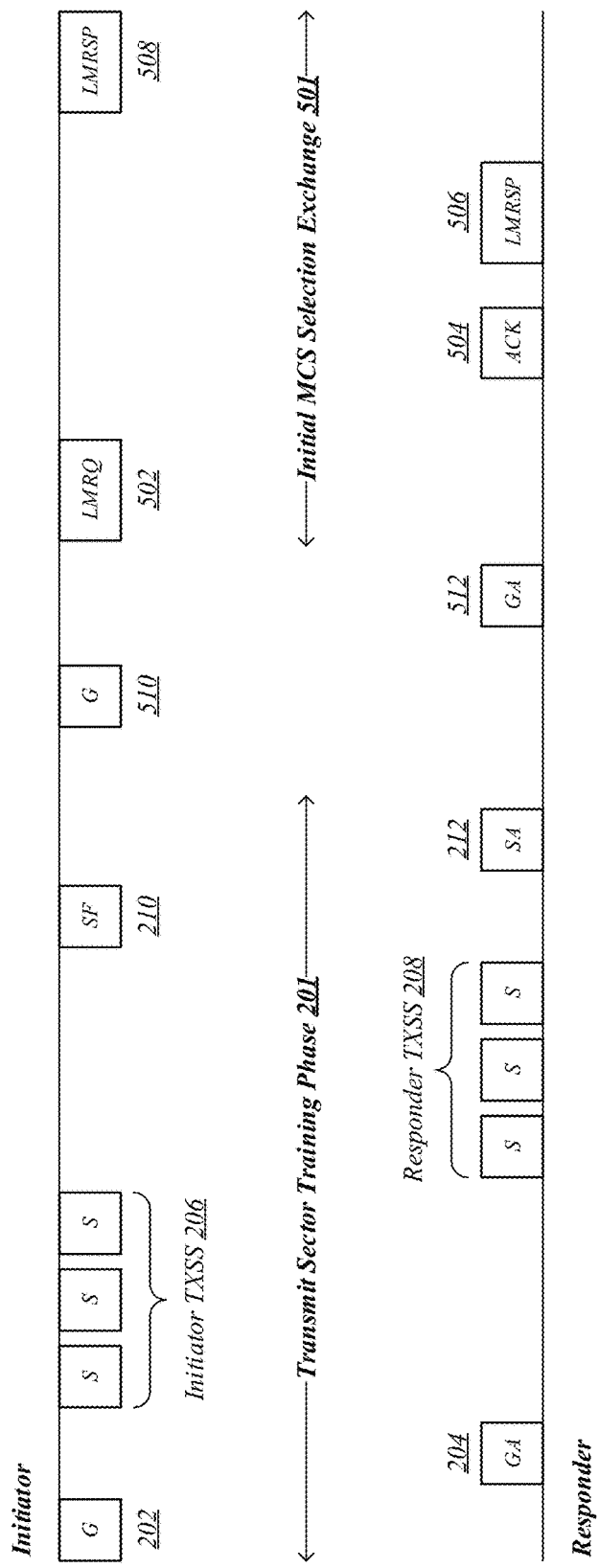
FIG. 5 illustrates an embodiment of a third communications flow.

FIG. 5 illustrates a communications flow 500 that may be representative of various embodiments in which an initiator and a responder implement reciprocity detection and utilization techniques for beamforming training. In communications flow 500, as in communications flows 200 and 250 of FIGS. 2A and 2B, the initiator and the responder exchange communications during transmit sector training phase 201 in order to identify their respective best TX sectors. However, in communications flow 500, following the transmit sector training phase 201, an initial modulation and coding scheme (MCS) selection exchange 501 is used as a beamforming reciprocity test. Upon initiation of the initial MCS selection exchange 501, the initiator and responder enter directional reception modes using RX sectors that correspond to substantially the same directions as their respective TX sectors, and the responder starts a counter and waits to receive a transmission from the initiator.

At the beginning of the initial MCS selection exchange 501, the initiator directionally transmits a link measurement request (LMRQ) frame 502 towards its best TX sector. If the responder receives the LMRQ frame 502, it responds by directionally transmitting an acknowledgment (ACK) frame 504 and a link measurement response (LMRSP) frame 506 towards its best TX sector. If the initiator receives the LMRSP frame 506, it responds with an LMRSP frame 508. Via this four-way handshake comprising the exchange of LMRQ frame 502, ACK frame 504, LMRSP frame 506, and LMRSP frame 508, the initiator and responder may identify an MCS to use for subsequent data transmissions. Because of the fact that it is performed while the initiator and responder are operating in directional reception modes using RX sectors that correspond to substantially the same directions as their respective TX sectors, the success of the four-way handshake may also confirm the presence of beamforming reciprocity.

In some embodiments, the initiator may measure a level of quality, such as an SNR, with which it receives LMRSP frame 506. In various embodiments, the initiator may compare this level of quality with a best level of quality, such as an SNR, with which it received a sector sweep frame during responder TXSS 208. In some embodiments, in performing this comparison, the initiator may account for a difference between an antenna array gain associated with an omni-directional receive mode used to receive the sector sweep frame during responder TXSS 208 and an antenna array gain associated with a directional receive mode used to receive LMRSP frame 506. In various embodiments, if the difference between the respective quality levels is greater than a threshold, then beamforming reciprocity is confirmed. In some embodiments, if beamforming reciprocity is not confirmed, the initiator may send a grant frame to initiate receive sector training, such as that of receive sector training phase 221 of FIG. 2A, or may initiate some other form of receive array training, such as beam refinement phase 251 of FIG. 2B. The embodiments are not limited in this context.

If the responder has not received LMRQ 502 by the time that its counter reaches a timeout value, it may determine that beamforming reciprocity is not present, exit the directional reception mode, and revert to an omni-directional reception mode. The initiator, having received no reply to LMRQ 502, may determine that beamforming reciprocity is not present and send a grant frame to initiate a receive sector sweep, such as that of receive sector training phase 221 of FIG. 2A. The responder, having reverted to the omni-directional reception mode, may successfully receive the grant frame, and the initiator and the responder may proceed with the receive sector sweep in order to identify their respective best RX sectors. It is worthy of note that in various embodiments, the initiator may not possess a transmission opportunity (TXOP) when transmit sector training phase 201 completes, and its transmission of LMRQ 502 may therefore be delayed until it is able to obtain a TXOP to permit it access to the wireless medium. In some embodiments, if beamforming reciprocity is present but the timeout value is reached at the responder before the initiator obtains a TXOP, the responder may erroneously determine that beamforming reciprocity is not present and the four-way handshake may fail. As such, in various embodiments, it may be desirable that the timeout value at the responder be high enough that typical delays associated with TXOP acquisition will not be of sufficient magnitude to cause the four-way handshake to fail.

In some embodiments, prior to and/or during transmit sector training phase 201, the initiator and responder may exchange capability information. In various embodiments, for example, the initiator and responder may exchange management frames comprising DMG capability information fields that contain information describing their respective capabilities. In some embodiments, the exchanged capability information may indicate whether the initiator and responder support beamforming reciprocity testing. In various embodiments, for example, the initiator may receive a management frame comprising a DMG capability information field that contains a DMG antenna pattern reciprocity bit indicating whether the responder supports beamforming reciprocity testing, and the responder may receive a management frame comprising a DMG capability information field that contains a DMG antenna pattern reciprocity bit indicating whether the initiator supports beamforming reciprocity testing. In some embodiments, if the exchanged capability information indicates that both the initiator and the responder support beamforming reciprocity testing, they may automatically initiate a test for beamforming reciprocity following transmit sector training phase 201. In such embodiments, the responder may automatically enter the directional reception mode following transmit sector training phase 201.

In various other embodiments in which the exchanged capability information indicates that both the initiator and the responder support beamforming reciprocity testing, it may be the initiator that decides that a test for beamforming reciprocity is to follow transmit sector training phase 201. In some such embodiments, the initiator may need to send a directional reception instruction to the responder in order to instruct the responder to enter the directional reception mode following transmit sector training phase 201. In various embodiments, the initiator may include the directional reception instruction in grant frame 202. In some embodiments, the directional reception instruction may be comprised in a beamforming control field of grant frame 202. In various embodiments, the directional reception instruction may comprise a value of a designated bit within the beamforming control field. In some embodiments, the responder may acknowledge the directional reception instruction by setting a value of a corresponding designated bit within a beamforming control field of grant acknowledgment frame 204. In various embodiments, the initiator may include the directional reception instruction in sector sweep feedback frame 210. In some embodiments, the directional reception instruction may be comprised in a sector sweep feedback field of sector sweep feedback frame 210. In various embodiments, the directional reception instruction may comprise a value of a designated bit within the sector sweep feedback field. In some embodiments, the responder may acknowledge the directional reception instruction by setting a value of a corresponding designated bit within a sector sweep feedback field of sector sweep acknowledgment frame 212.

In various embodiments, the initiator may not send the directional reception instruction to the responder until after the completion of transmit sector training phase 201. For example, in some embodiments, the initiator may include the directional reception instruction in a grant frame 510 that it sends following completion of transmit sector training phase 201. In various embodiments, the directional reception instruction may be comprised in a beamforming control field of grant frame 510. In some embodiments, the directional reception instruction may comprise a value of a designated bit within the beamforming control field. In various embodiments, the responder may acknowledge the directional reception instruction by setting a value of a corresponding designated bit within a beamforming control field of a grant acknowledgment frame 512 that it sends in response to grant frame 510.

In some embodiments, following receipt of grant acknowledgment frame 512, the initiator may commence initial MCS selection exchange 501. In various embodiments, in lieu of initial MCS selection exchange 501, the initiator may commence another type of exchange that uses a data MCS. In some embodiments, grant frame 510 may comprise a duration field that specifies a timeout value for use by the responder. In various embodiments, the initiator may set the duration field to a large enough value to enable completion of the exchange that follows its receipt of grant acknowledgment frame 512. In some embodiments, the responder may start a counter in response to receipt of grant frame 510, and if it has not received a packet from the initiator by the time the counter reaches the value comprised in the duration field in grant frame 510, the responder may revert to the omni-directional reception mode. In various embodiments, if the initiator does not receive proper responses during the exchange that follows its receipt of grant acknowledgment frame 512, it may initiate a receive sector sweep, such as that of receive sector training phase 221 of FIG. 2A. The embodiments are not limited in this context.

Figure 6:
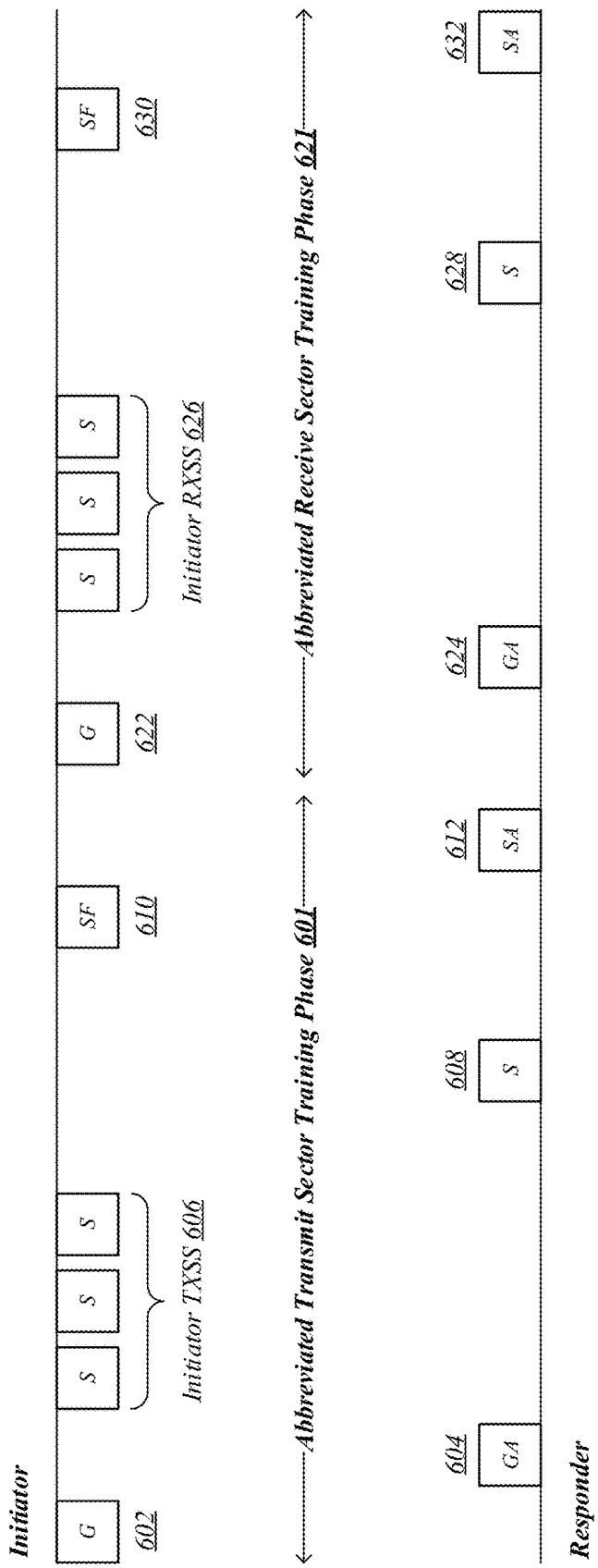
FIG. 6 illustrates an embodiment of a fourth communications flow.

FIG. 6 illustrates a communications flow 600 that may be representative of some embodiments in which an initiator and a responder implement reciprocity detection and utilization techniques for beamforming training. More particularly, communications flow 600 may be representative of an abbreviated beamforming training procedure that may be utilized in various embodiments by an initiator and a responder between which a previously established connection exists. In some embodiments, the initiator and the responder may automatically utilize such an abbreviated beamforming training procedure if previously exchanged capability information indicates that they both support beamforming reciprocity testing. In various other embodiments in which both the initiator and responder support beamforming reciprocity testing, the initiator may instruct the responder that the abbreviated beamforming training procedure is to be used. In some embodiments, the initiator may provide this instruction to the responder during the course of an initial beamforming training procedure and beamforming reciprocity test. For example, in various embodiments, the initiator may include this instruction within grant frame 202, sector sweep feedback frame 210, or grant frame 510 of FIG. 5. In some other embodiments, the initiator may provide this instruction to the responder in conjunction with initiating the abbreviated beamforming training procedure. The embodiments are not limited in this context.

As shown in FIG. 6, in various embodiments, communications flow 600 may comprise an abbreviated transmit sector training phase 601 and an abbreviated receive sector training phase 621. In some embodiments, abbreviated transmit sector training phase 601 may begin with the initiator sending a grant frame 602, to which the responder may reply by sending a grant acknowledgment frame 604. In various embodiments, the initiator may include an abbreviated beamforming training instruction in grant frame 602 in order to instruct the responder to perform the abbreviated beamforming training procedure. In some embodiments, the abbreviated beamforming training instruction may be comprised in a beamforming control field of grant frame 602. In various embodiments, the abbreviated beamforming training instruction may comprise a value of a designated bit within the beamforming control field. In some embodiments, the responder may acknowledge the abbreviated beamforming training instruction by setting a value of a corresponding designated bit within a beamforming control field of grant acknowledgment frame 604. In various embodiments, following receipt of grant acknowledgment frame 604, the initiator may send a series of sector sweep frames during an initiator TXSS 606. In some embodiments, the initiator and the responder may not exchange grant frame 602 and grant acknowledgment frame 604, and abbreviated transmit sector training phase 601 may begin with the initiator TXSS 606. The embodiments are not limited in this context.

In various embodiments, during the initiator TXSS 606, the initiator may transmit a plurality of sector sweep frames, each towards a respective one of a plurality of initiator TX sectors. In some embodiments, each such sector sweep frame may contain a sector ID for the initiator TX sector from which it is transmitted. In various embodiments, the responder may listen for the transmitted sector sweep frames using an omnidirectional or quasi-omnidirectional receive antenna configuration, and may measure a respective level of quality with which it receives each sector sweep frame that it successfully receives. In some embodiments, the responder may identify a sector sweep frame received with a highest level of quality, and identify an initiator TX sector associated with the sector ID comprised in that sector sweep frame as a best initiator TX sector. In various embodiments, rather than performing a responder TXSS following the initiator TXSS as it does in communications flow 200 of FIG. 2A, the responder may send a single sector sweep frame 608 following initiator TXSS 606. In some embodiments, the sector sweep frame 608 may contain the sector ID for the best initiator TX sector, as well as an indicator of the level of quality with which the sector sweep frame comprising that sector ID was received at the responder. In various embodiments, the responder may transmit sector sweep frame 608 towards a previously selected responder TX sector, such as a responder TX sector previously selected during an initial beamforming training procedure. In some embodiments in which the responder sends grant acknowledgment frame 604, it may transmit both grant acknowledgment 604 and sector sweep frame 608 towards the previously selected responder TX sector. In various embodiments, the initiator may reply to sector sweep frame 608 by sending a sector sweep feedback frame 610, and the responder may reply to the sector sweep feedback frame 610 by sending a sector sweep acknowledgment frame 612. The embodiments are not limited in this context.

In some embodiments, following receipt of sector sweep acknowledgment frame 612, the initiator may commence abbreviated receive sector training phase 621. In various embodiments, the initiator may commence abbreviated receive sector training phase 621 by sending a grant frame 622, to which the responder may reply by sending a grant acknowledgment frame 624. In some embodiments, grant frame 622 and grant acknowledgment frame 624 may be the same as—or similar to—grant frame 602 and grant acknowledgment frame 604, respectively. In various embodiments, following receipt of grant acknowledgment frame 624, the initiator may send a series of sector sweep frames during an initiator RXSS 626. In some embodiments, the initiator and the responder may not exchange grant frame 622 and grant acknowledgment frame 624, and abbreviated receive sector training phase 621 may begin with the initiator RXSS 626. In various embodiments, during the initiator RXSS 626, the initiator may transmit a plurality of sector sweep frames, each towards the best initiator TX sector identified during abbreviated transmit sector training phase 601. In some embodiments in which the initiator sends grant frame 622, it may also transmit grant frame 622 towards that best initiator TX sector. The embodiments are not limited in this context.

In various embodiments, the responder may monitor a different respective RX sector during the transmission of each of the plurality of sector sweep frames of initiator RXSS 626, and may measure a respective level of quality with which it receives each sector sweep frame that it successfully receives. In some embodiments, the responder may identify a sector sweep frame received with a highest level of quality, and identify a responder RX sector being monitored at the time of receipt of that sector sweep frame as a best responder RX sector. In various embodiments, rather than performing a responder RXSS following the initiator RXSS as it does in communications flow 200 of FIG. 2A, the responder may send a single sector sweep frame 628 following initiator RXSS 626. In some embodiments, the responder may transmit the sector sweep frame 628 towards a responder TX sector that corresponds substantially to the best responder RX sector or towards a best previously known responder TX sector. In various embodiments, the initiator may reply to sector sweep frame 628 by sending a sector sweep feedback frame 630, and the responder may reply to the sector sweep feedback frame 630 by sending a sector sweep acknowledgment frame 632. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 7:
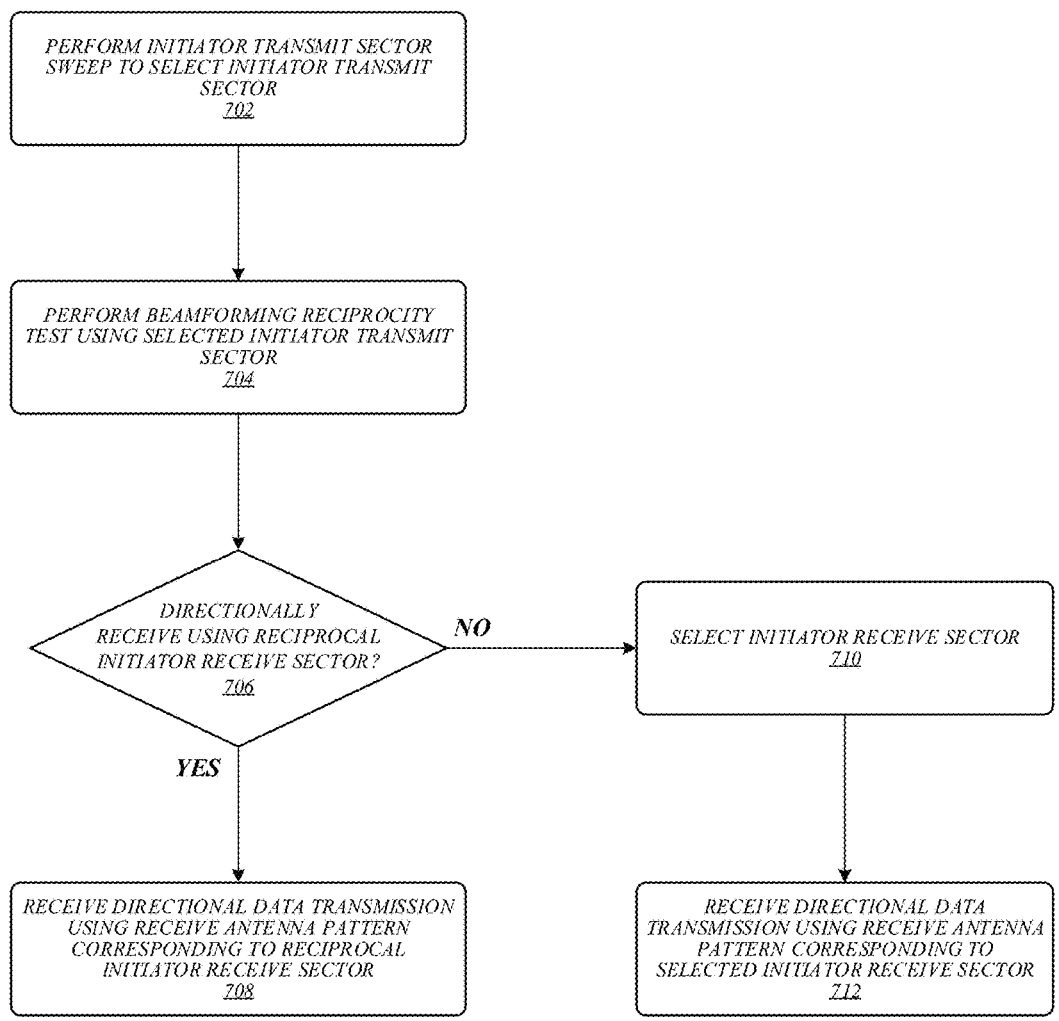
FIG. 7 illustrates an embodiment of a first logic flow.

FIG. 7 illustrates one embodiment of a logic flow 700, which may be representative of operations that may be executed by a beamforming training initiator in various embodiments in conjunction with the implementation of reciprocity detection and utilization techniques for beamforming training. For example, logic flow 700 may be representative of operations that may be executed by 60 GHz-capable device 102 or 60 GHz-capable device 104 of FIG. 1 in conjunction with acting as the initiator in communications flow 500 of FIG. 5. As shown in FIG. 7, an initiator transmit sector sweep may be performed at 702 in order to select an initiator transmit sector. For example, the initiator in communications flow 500 of FIG. 5 may perform initiator TXSS 206 in order to select its transmit sector. At 704, a beamforming reciprocity test may be performed using the selected initiator transmit sector. For example, the initiator in communications flow 500 of FIG. 5 may select as its transmit sector a transmit sector corresponding to a sector ID comprised in the sector sweep frames it receives during responder TXSS 208, and may perform a beamforming reciprocity test comprising initial MCS selection exchange

501, according to which it may transmit LMRQ frame 502 towards its selected transmit sector.

At 706, based on an outcome of the beamforming reciprocity test at 704, it may be determined whether directional reception is to be performed using a reciprocal initiator receive sector for the initiator transmit sector. For example, the initiator in communications flow 500 of FIG. 5 may determine whether to directionally receive via a reciprocal receive sector for its selected transmit sector based on whether initial MCS selection exchange 501 is successful. If it is determined at 706 that directional reception is to be performed using the reciprocal initiator receive sector for the initiator transmit sector, flow may pass to 708, where a directional data transmission may be received using a receive antenna pattern corresponding to the reciprocal initiator receive sector. For example, following a determination to directionally receive via the reciprocal receive sector for its selected transmit sector, the initiator in communications flow 500 of FIG. 5 may receive a directional data transmission from the responder using a receive antenna pattern that corresponds to the reciprocal receive sector for its selected transmit sector.

If it is determined at 706 that directional reception is not to be performed using the reciprocal initiator receive sector for the initiator transmit sector, flow may pass to 710, where an initiator receive sector may be selected. For example, in response to a determination not to directionally receive via the reciprocal receive sector for its selected transmit sector, the initiator in communications flow 500 of FIG. 5 may commence receive sector training phase 221 of FIG. 2A or beam refinement phase 251 of FIG. 2B in order to select a receive sector. At 712, a directional data transmission may be received using a receive antenna pattern corresponding to the selected initiator receive sector. For example, the initiator in communications flow 500 of FIG. 5 may receive a directional data transmission from the responder using a receive antenna pattern that corresponds to the receive sector selected at 710. The embodiments are not limited to these examples.

Figure 8:
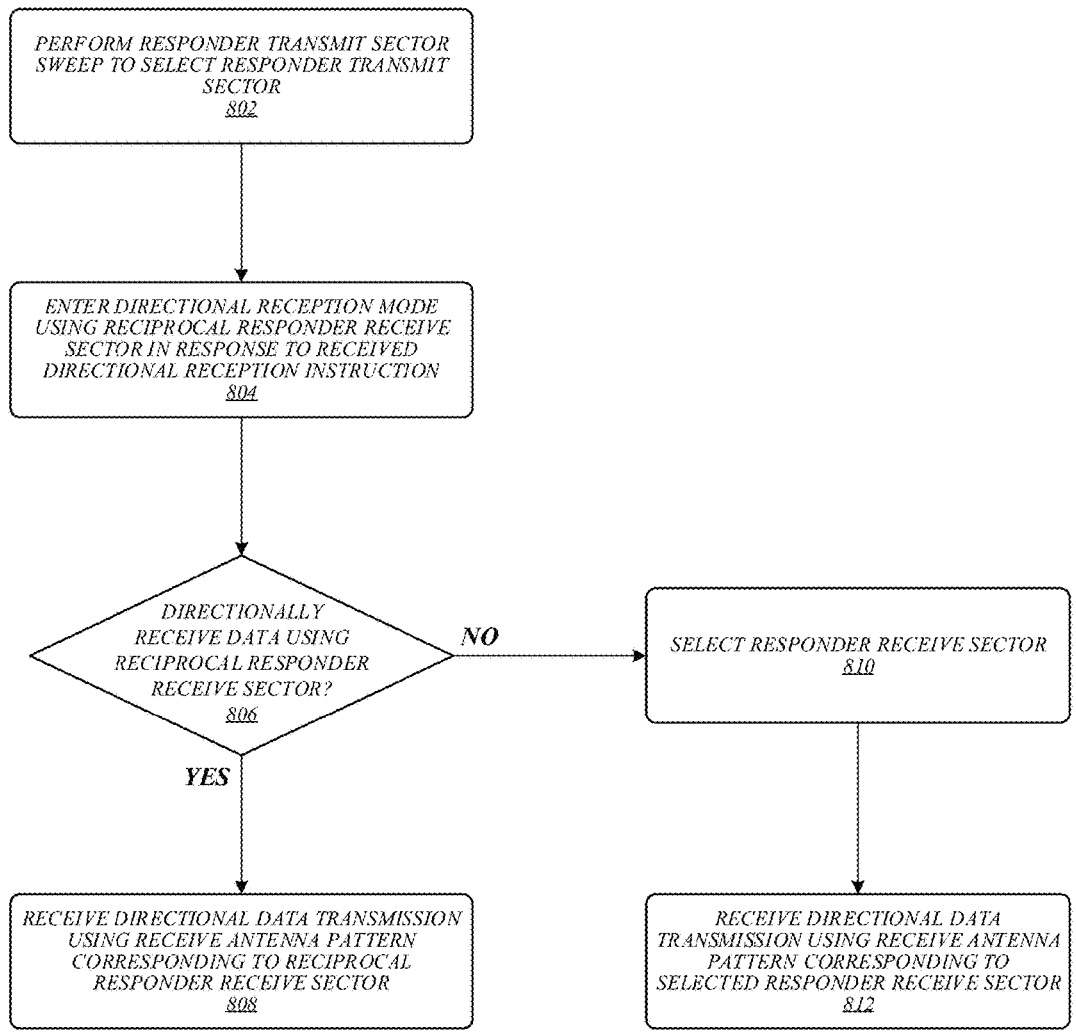
FIG. 8 illustrates an embodiment of a second logic flow.

FIG. 8 illustrates one embodiment of a logic flow 800, which may be representative of operations that may be executed by a beamforming training responder in some embodiments in conjunction with the implementation of reciprocity detection and utilization techniques for beamforming training. For example, logic flow 800 may be representative of operations that may be executed by 60 GHz-capable device 102 or 60 GHz-capable device 104 of FIG. 1 in conjunction with acting as the responder in communications flow 500 of FIG. 5. As shown in FIG. 8, a responder transmit sector sweep may be performed at 802 in order to select a responder transmit sector. For example, the responder in communications flow 500 of FIG. 5 may perform responder TXSS 208 in order to select its transmit sector. At 804, a directional reception mode may be entered using a reciprocal responder receive sector for the responder transmit sector in response to a received directional reception instruction. For example, in response to a received directional reception instruction, the responder in communications flow 500 of FIG. 5 may enter a directional reception mode using a reciprocal receive sector for its selected transmit sector.

It is worthy of note that in various embodiments, the received directional reception instruction of block 804 may have been received prior to the performance of the responder transmit sector sweep at 802. For example, the responder in communications flow 500 of FIG. 5 may enter a directional reception mode using a reciprocal receive sector for its selected transmit sector in response to a directional reception instruction comprised in grant frame 202. In some other embodiments, the responder transmit sector sweep at 802 may be performed prior to the reception of the directional reception instruction of block 804. For example, the responder in communications flow 500 of FIG. 5 may enter a directional reception mode using a reciprocal receive sector for its selected transmit sector in response to a directional reception instruction comprised in sector sweep feedback frame 210 or grant frame 510. In yet other embodiments, the reciprocal responder receive sector may be used in conjunction with entering the directional reception mode at 804 based on a determination that both the initiator and the responder in the responder transmit sector sweep at 802 support beamforming reciprocity testing, rather than in response to a received directional reception instruction. For example, the responder in communications flow 500 of FIG. 5 may enter a directional reception mode using a reciprocal receive sector for its selected transmit sector in response to a determination that exchanged capability information indicates that both the initiator and the responder support beamforming reciprocity testing. The embodiments are not limited in this context.

At 806, it may be determined whether directional data reception is to be performed using the reciprocal responder receive sector. For example, the responder in communications flow 500 of FIG. 5 may determine whether to directionally receive data via the reciprocal receive sector for its selected transmit sector based on whether initial MCS selection exchange 501 is successful. If a determination is made at 806 to directionally receive data using the reciprocal responder receive sector, flow may pass to 808, where a directional data transmission may be received using a receive antenna pattern corresponding to the reciprocal responder receive sector. For example, in response to success of initial MCS selection exchange 501, the responder in communications flow 500 of FIG. 5 may determine to directionally receive data via the reciprocal receive sector for its selected transmit sector, and may subsequently receive a directional data transmission from the initiator using a receive antenna pattern that corresponds to the reciprocal receive sector for its selected transmit sector.

If a determination is made at 806 to not use the reciprocal responder receive sector for directional data reception, flow may pass to 810, where a responder receive sector may be selected. For example, in response to failure of initial MCS selection exchange 501, the responder in communications flow 500 of FIG. 5 may set its receive configuration to a quasi-omnidirectional receive pattern, the initiator and the responder may perform the communications exchange of receive sector training phase 221 of FIG. 2A, and the responder may select its receive sector during initiator RXSS 226. At 812, a directional data transmission may be received using a receive antenna pattern corresponding to the selected responder receive sector. For example, the responder in communications flow 500 of FIG. 5 may receive a directional data transmission from the initiator using a receive antenna pattern that corresponds to the receive sector selected at 810. The embodiments are not limited to these examples.

FIG. 9 illustrates an embodiment of a storage medium 900. Storage medium 900 may comprise any non-transitory computer-readable storage medium or machine-readable storage medium, such as an optical, magnetic or semiconductor storage medium. In various embodiments, storage medium 900 may comprise an article of manufacture. In some embodiments, storage medium 900 may store computer-executable instructions, such as computer-executable instructions to implement one or both of logic flow 700 of FIG. 7 and logic flow 800 of FIG. 8. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 10:
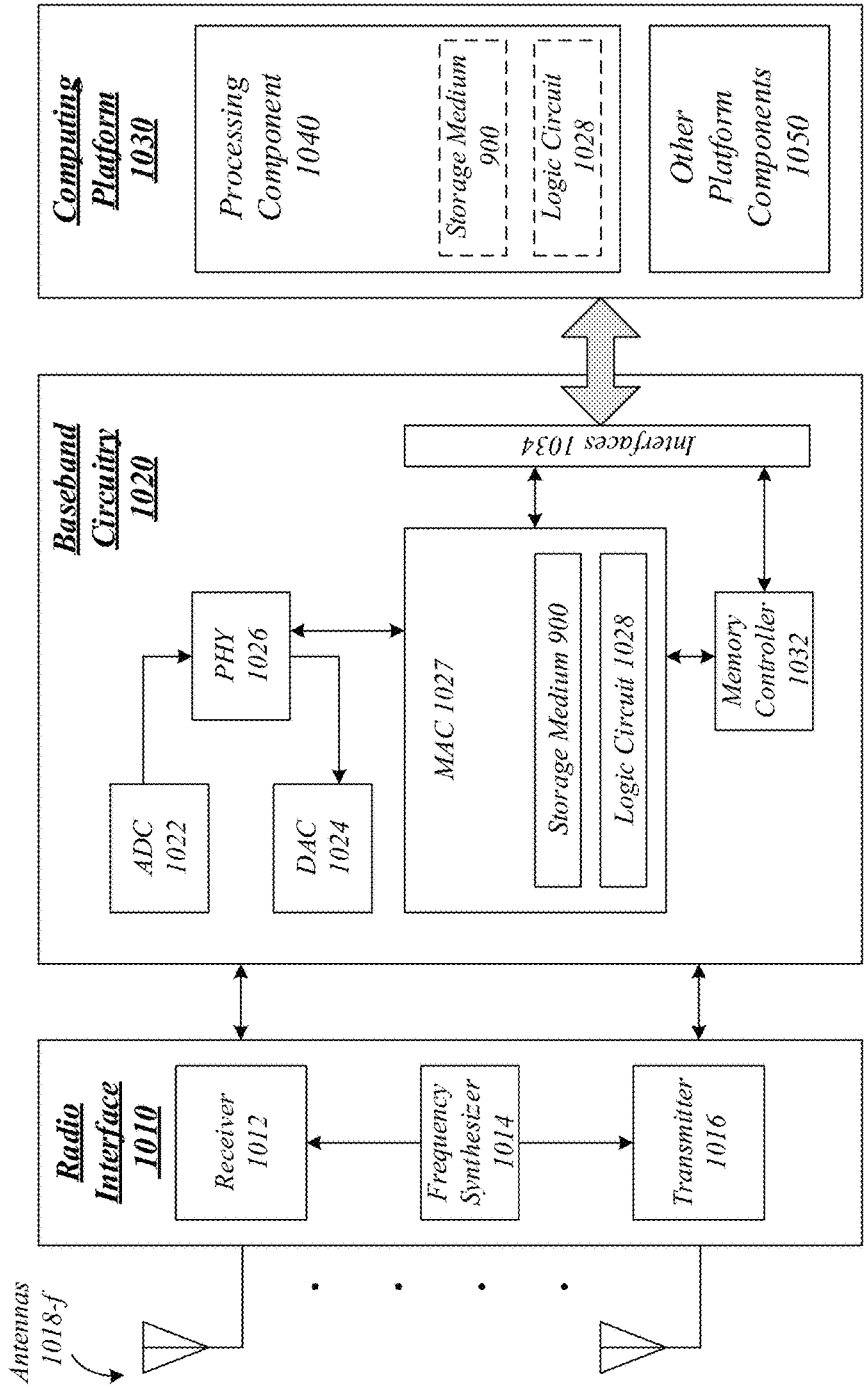
FIG. 10 illustrates an embodiment of a device.

FIG. 10 illustrates an embodiment of a communications device 1000 that may implement one or more of 60 GHz-capable devices 102 and 104 of FIG. 1, initiator 302 and responder 304 of FIGS. 3 and 4, logic flow 700 of FIG. 7, logic flow 800 of FIG. 8, and storage medium 900 of FIG. 9. In various embodiments, device 1000 may comprise a logic circuit 1028. The logic circuit 1028 may include physical circuits to perform operations described for one or more of 60 GHz-capable devices 102 and 104 of FIG. 1, initiator 302 and responder 304 of FIGS. 3 and 4, logic flow 700 of FIG. 7, and logic flow 800 of FIG. 8, for example. As shown in FIG. 10, device 1000 may include a radio interface 1010, baseband circuitry 1020, and computing platform 1030, although the embodiments are not limited to this configuration.

The device 1000 may implement some or all of the structure and/or operations for one or more of 60 GHz-capable devices 102 and 104 of FIG. 1, initiator 302 and responder 304 of FIGS. 3 and 4, logic flow 700 of FIG. 7, logic flow 800 of FIG. 8, storage medium 900 of FIG. 9, and logic circuit 1028 in a single computing entity, such as entirely within a single device. Alternatively, the device 1000 may distribute portions of the structure and/or operations for one or more of 60 GHz-capable devices 102 and 104 of FIG. 1, initiator 302 and responder 304 of FIGS. 3 and 4, logic flow 700 of FIG. 7, logic flow 800 of FIG. 8, storage medium 900 of FIG. 9, and logic circuit 1028 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1010 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 1010 may include, for example, a receiver 1012, a frequency synthesizer 1014, and/or a transmitter 1016. Radio interface 1010 may include bias controls, a crystal oscillator and/or one or more antennas 1018-f. In another embodiment, radio interface 1010 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1020 may communicate with radio interface 1010 to process receive and/or transmit signals and may include, for example, an analog-to-digital converter 1022 for down converting received signals, a digital-to-analog converter 1024 for up converting signals for transmission. Further, baseband circuitry 1020 may include a baseband or physical layer (PHY) processing circuit 1026 for PHY link layer processing of respective receive/transmit signals. Baseband circuitry 1020 may include, for example, a medium access control (MAC) processing circuit 1027 for MAC/data link layer processing. Baseband circuitry 1020 may include a memory controller 1032 for communicating with MAC processing circuit 1027 and/or a computing platform 1030, for example, via one or more interfaces 1034.

In some embodiments, PHY processing circuit 1026 may include a frame construction and/or detection module, in combination with additional circuitry such as a buffer memory, to construct and/or deconstruct communication frames. Alternatively or in addition, MAC processing circuit 1027 may share processing for certain of these functions or perform these processes independent of PHY processing circuit 1026. In some embodiments, MAC and PHY processing may be integrated into a single circuit.

The computing platform 1030 may provide computing functionality for the device 1000. As shown, the computing platform 1030 may include a processing component 1040. In addition to, or alternatively of, the baseband circuitry 1020, the device 1000 may execute processing operations or logic for one or more of 60 GHz-capable devices 102 and 104 of FIG. 1, initiator 302 and responder 304 of FIGS. 3 and 4, logic flow 700 of FIG. 7, logic flow 800 of FIG. 8, storage medium 900 of FIG. 9, and logic circuit 1028 using the processing component 1040. The processing component 1040 (and/or PHY 1026 and/or MAC 1027) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1030 may further include other platform components 1050. Other platform components 1050 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1000 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1000 described herein, may be included or omitted in various embodiments of device 1000, as suitably desired.

Embodiments of device 1000 may be implemented using single input single output (SISO) architectures. However, certain implementations may include multiple antennas (e.g., antennas 1018-*f*) for transmission and/or reception using adaptive antenna techniques for beamforming or spatial division multiple access (SDMA) and/or using MIMO communication techniques.

The components and features of device 1000 may be implemented using any combination of discrete circuitry, application specific integrated circuits (ASICs), logic gates and/or single chip architectures. Further, the features of device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 11:
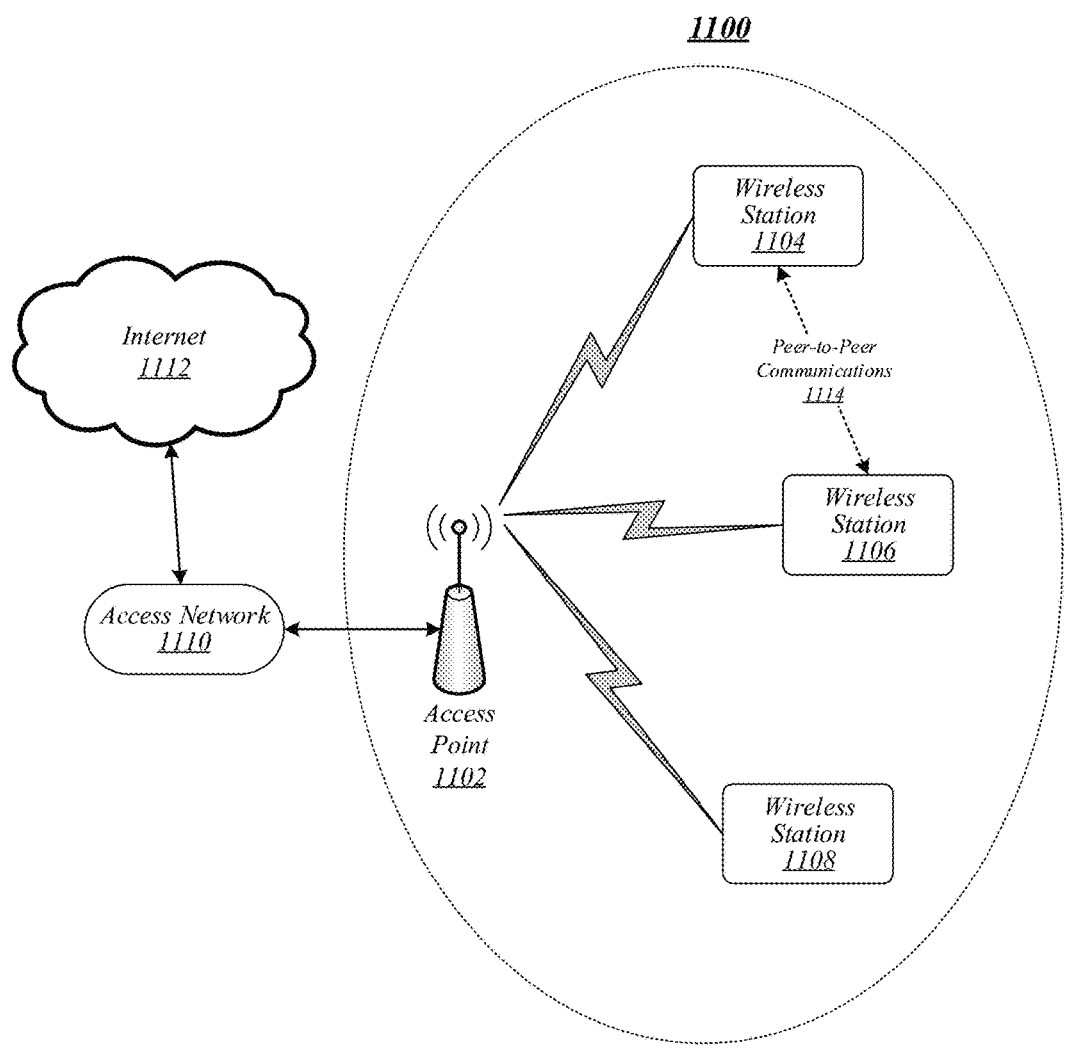
FIG. 11 illustrates an embodiment of a wireless network.

FIG. 11 illustrates an embodiment of a wireless network 1100. As shown in FIG. 11, wireless network comprises an access point 1102 and wireless stations 1104, 1106, and 1108. In various embodiments, wireless network 1100 may comprise a wireless local area network (WLAN), such as a WLAN implementing one or more Institute of Electrical and Electronics Engineers (IEEE) 802.11 standards (sometimes collectively referred to as "Wi-Fi"). In some other embodiments, wireless network 1100 may comprise another type of wireless network, and/or may implement other wireless communications standards. In various embodiments, for example, wireless network 1100 may comprise a WWAN or WPAN rather than a WLAN. The embodiments are not limited to this example.

In some embodiments, wireless network 1100 may implement one or more broadband wireless communications standards, such as 3G or 4G standards, including their revisions, progeny, and variants. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8-12 of LTE/System Architecture Evolution (SAE), and so forth. The embodiments are not limited in this context.

In various embodiments, wireless stations 1104, 1106, and 1108 may communicate with access point 1102 in order to obtain connectivity to one or more external data networks. In some embodiments, for example, wireless stations 1104, 1106, and 1108 may connect to the Internet 1112 via access point 1102 and access network 1110. In various embodiments, access network 1110 may comprise a private network that provides subscription-based Internet-connectivity, such as an Internet Service Provider (ISP) network. The embodiments are not limited to this example.

In various embodiments, two or more of wireless stations 1104, 1106, and 1108 may communicate with each other directly by exchanging peer-to-peer communications. For example, in the example of FIG. 11, wireless stations 1104 and 1106 communicate with each other directly by exchanging peer-to-peer communications 1114. In some embodiments, such peer-to-peer communications may be performed according to one or more Wi-Fi Alliance (WFA) standards. For example, in various embodiments, such peer-to-peer communications may be performed according to the WFA Wi-Fi Direct standard, 2010 Release. In various embodiments, such peer-to-peer communications may additionally or alternatively be performed using one or more interfaces, protocols, and/or standards developed by the WFA Wi-Fi Direct Services (WFDS) Task Group. The embodiments are not limited to these examples.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Example 1 is a wireless communication apparatus, comprising a station (STA) comprising logic, at least a portion of which is in hardware, the logic to perform an initiator transmit sector sweep (TXSS) to select an initiator transmit (TX) sector, perform a beamforming reciprocity test using the selected initiator TX sector, and determine whether to perform directional reception using a reciprocal initiator receive (RX) sector for the initiator TX sector based on an outcome of the beamforming reciprocity test.

Example 2 is the wireless communication apparatus of Example 1, the logic to initiate an initial modulation and coding scheme (MCS) selection exchange comprising the beamforming reciprocity test.

Example 3 is the wireless communication apparatus of Example 1, the logic to send a link measurement request frame during the beamforming reciprocity test.

Example 4 is the wireless communication apparatus of Example 3, the logic to cause a signal comprising the link measurement request frame to be directionally transmitted using a transmit antenna pattern corresponding to the selected initiator TX sector.

Example 5 is the wireless communication apparatus of Example 3, the logic to determine that the beamforming reciprocity test has succeeded based on receipt of a link measurement response frame in response to the link measurement request frame.

Example 6 is the wireless communication apparatus of Example 5, the logic to send a second link measurement response frame in response to the received link measurement response frame.

Example 7 is the wireless communication apparatus of Example 3, the logic to determine that the beamforming reciprocity test has failed in response to a determination that no reply to the link measurement request frame has been received.

Example 8 is the wireless communication apparatus of Example 1, the logic to determine to perform directional reception using the reciprocal initiator RX sector and cause a directional data transmission to be received using a receive antenna pattern corresponding to the reciprocal initiator RX sector in response to a determination that the beamforming reciprocity test has succeeded.

Example 9 is the wireless communication apparatus of Example 1, the logic to determine not to perform directional reception using the reciprocal initiator RX sector and select an initiator RX sector in response to a determination that the beamforming reciprocity test has failed.

Example 10 is the wireless communication apparatus of Example 9, the logic to initiate a receive sector training procedure in response to the determination not to perform directional reception using the reciprocal initiator RX sector and cause a directional data transmission to be received using a receive antenna pattern corresponding to the selected initiator RX sector.

Example 11 is the wireless communication apparatus of Example 10, the logic to select the initiator RX sector based on one or more sector sweep frames received during a responder receive sector sweep (RXSS) comprised in the receive sector training procedure.

Example 12 is the wireless communication apparatus of Example 9, the logic to initiate a beam refinement procedure in response to the determination not to perform directional reception using the reciprocal initiator RX sector, select the initiator RX sector according to a result of the beam refinement procedure, and cause a directional data transmission to be received using a receive antenna pattern corresponding to the selected initiator RX sector.

Example 13 is the wireless communication apparatus of Example 1, the logic to send a directional reception instruction to instruct a responder to enter a directional reception mode, the directional reception instruction to instruct the responder to enter the directional reception mode following a responder TXSS comprised in a same transmit sector training procedure as the initiator TXSS.

Example 14 is the wireless communication apparatus of Example 13, the logic to send a grant frame comprising the directional reception instruction.

Example 15 is the wireless communication apparatus of Example 14, the directional reception instruction to comprise a value of a designated bit in a beamforming control field of the grant frame.

Example 16 is the wireless communication apparatus of Example 14, the logic to receive a grant acknowledgment frame in response to the grant frame, the grant acknowledgment frame to contain an acknowledgment of the directional reception instruction.

Example 17 is the wireless communication apparatus of Example 16, the acknowledgment of the directional reception instruction to comprise a value of a designated bit in a beamforming control field of the grant acknowledgment frame.

Example 18 is the wireless communication apparatus of Example 14, the logic to send the grant frame comprising the directional reception instruction following the transmit sector training procedure.

Example 19 is the wireless communication apparatus of Example 13, the logic to send a sector sweep feedback frame comprising the directional reception instruction.

Example 20 is the wireless communication apparatus of Example 19, the directional reception instruction to comprise a value of a designated bit in a sector sweep feedback field of the sector sweep feedback frame.

Example 21 is the wireless communication apparatus of Example 19, the logic to receive a sector sweep acknowledgment frame in response to the sector sweep feedback frame, the sector sweep acknowledgment frame to contain an acknowledgment of the directional reception instruction.

Example 22 is the wireless communication apparatus of Example 21, the acknowledgment of the directional reception instruction to comprise a value of a designated bit in a sector sweep feedback field of the sector sweep acknowledgment frame.

Example 23 is a system, comprising a wireless communication apparatus according to any of Examples 1 to 22, at least one radio frequency (RF) transceiver, and at least one RF antenna.

Example 24 is the system of Example 23, comprising a touchscreen display.

Example 25 is a wireless communication apparatus, comprising a station (STA) comprising logic, at least a portion of which is in hardware, the logic to perform a responder transmit sector sweep (RXSS) to select a responder transmit (TX) sector, enter a directional reception mode using a reciprocal responder receive (RX) sector for the responder TX sector, and determine whether to use the reciprocal responder RX sector for directional data reception based on an outcome of a beamforming reciprocity test.

Example 26 is the wireless communication apparatus of Example 25, the beamforming reciprocity test to comprise at least a portion of an initial modulation and coding scheme (MCS) selection exchange.

Example 27 is the wireless communication apparatus of Example 25, the logic to receive a link measurement request frame and send a link measurement response frame in response to the link measurement request frame during the beamforming reciprocity test.

Example 28 is the wireless communication apparatus of Example 27, the logic to determine that the beamforming reciprocity test has succeeded based on receipt of a second link measurement response frame in response to the sent link measurement response frame.

Example 29 is the wireless communication apparatus of Example 27, the logic to determine that the beamforming reciprocity test has failed in response to a determination that no second link measurement response frame has been received in response to the sent link measurement response frame.

Example 30 is the wireless communication apparatus of Example 25, the logic to determine to use the reciprocal responder RX sector for directional data reception and cause a directional data transmission to be received using a receive antenna pattern corresponding to the reciprocal responder RX sector in response to a determination that the beamforming reciprocity test has succeeded.

Example 31 is the wireless communication apparatus of Example 25, the logic to determine not to use the reciprocal responder RX sector for directional data reception and select a responder RX sector in response to a determination that the beamforming reciprocity test has failed.

Example 32 is the wireless communication apparatus of Example 31, the logic to select the responder RX sector based on one or more sector sweep frames received during an initiator receive sector sweep (RXSS) of a receive sector training procedure.

Example 33 is the wireless communication apparatus of Example 31, the logic to cause a directional data transmission to be received using a receive antenna pattern corresponding to the selected responder RX sector.

Example 34 is the wireless communication apparatus of Example 25, the logic to determine to enter the directional reception mode using the reciprocal responder RX sector based on a received directional reception instruction.

Example 35 is the wireless communication apparatus of Example 34, the directional reception instruction to be comprised in a received grant frame.

Example 36 is the wireless communication apparatus of Example 35, the directional reception instruction to comprise a value of a designated bit in a beamforming control field of the grant frame.

Example 37 is the wireless communication apparatus of Example 34, the logic to send a grant acknowledgment frame in response to the grant frame, the grant acknowledgment frame to contain an acknowledgment of the directional reception instruction.

Example 38 is the wireless communication apparatus of Example 37, the acknowledgment of the directional reception instruction to comprise a value of a designated bit in a beamforming control field of the grant acknowledgment frame.

Example 39 is the wireless communication apparatus of Example 34, the directional reception instruction to be comprised in a received sector sweep feedback frame.

Example 40 is the wireless communication apparatus of Example 39, the directional reception instruction to comprise a value of a designated bit in a sector sweep feedback field of the sector sweep feedback frame.

Example 41 is the wireless communication apparatus of Example 34, the logic to send a sector sweep acknowledgment frame in response to the sector sweep feedback frame, the sector sweep acknowledgment frame to contain an acknowledgment of the directional reception instruction.

Example 42 is the wireless communication apparatus of Example 41, the acknowledgment of the directional reception instruction to comprise a value of a designated bit in a sector sweep feedback field of the sector sweep acknowledgment frame.

Example 43 is the wireless communication apparatus of Example 25, the logic to determine to enter the directional reception mode using the reciprocal responder RX sector based on a value of a bit in directional multi-gigabit (DMG) capability information field of a received management frame.

Example 44 is a system, comprising a wireless communication apparatus according to any of Examples 25 to 43, at least one radio frequency (RF) transceiver, and at least one RF antenna.

Example 45 is the system of Example 44, comprising a touchscreen display.

Example 46 is at least one non-transitory computer-readable storage medium comprising a set of wireless communication instructions that, in response to being executed at a station (STA), cause the STA to perform an initiator transmit sector sweep (TXSS) to select an initiator transmit (TX) sector, perform a beamforming reciprocity test using the selected initiator TX sector, and determine whether to perform directional reception using a reciprocal initiator receive (RX) sector for the initiator TX sector based on an outcome of the beamforming reciprocity test.

Example 47 is the at least one non-transitory computer-readable storage medium of Example 46, comprising wireless communication instructions that, in response to being executed at the STA, cause the STA to initiate an initial modulation and coding scheme (MCS) selection exchange comprising the beamforming reciprocity test.

Example 48 is the at least one non-transitory computer-readable storage medium of Example 46, comprising wireless communication instructions that, in response to being executed at the STA, cause the STA to send a link measurement request frame during the beamforming reciprocity test.

Example 49 is the at least one non-transitory computer-readable storage medium of Example 48, comprising wireless communication instructions that, in response to being executed at the STA, cause the STA to directionally transmit a signal comprising the link measurement request frame using a transmit antenna pattern corresponding to the selected initiator TX sector.

Example 50 is the at least one non-transitory computer-readable storage medium of Example 48, comprising wireless communication instructions that, in response to being executed at the STA, cause the STA to determine that the beamforming reciprocity test has succeeded based on receipt of a link measurement response frame in response to the link measurement request frame.

Example 51 is the at least one non-transitory computer-readable storage medium of Example 50, comprising wireless communication instructions that, in response to being executed at the STA, cause the STA to send a second link measurement response frame in response to the received link measurement response frame.

Example 52 is the at least one non-transitory computer-readable storage medium of Example 48, comprising wireless communication instructions that, in response to being executed at the STA, cause the STA to determine that the beamforming reciprocity test has failed in response to a determination that no reply to the link measurement request frame has been received.

Example 53 is the at least one non-transitory computer-readable storage medium of Example 46, comprising wireless communication instructions that, in response to being executed at the STA, cause the STA to in response to a determination that the beamforming reciprocity test has succeeded determine to perform directional reception using the reciprocal initiator RX sector, and receive a directional data transmission using a receive antenna pattern corresponding to the reciprocal initiator RX sector.

Example 54 is the at least one non-transitory computer-readable storage medium of Example 46, comprising wireless communication instructions that, in response to being executed at the STA, cause the STA to in response to a determination that the beamforming reciprocity test has failed determine not to perform directional reception using the reciprocal initiator RX sector, and select an initiator RX sector.

Example 55 is the at least one non-transitory computer-readable storage medium of Example 54, comprising wireless communication instructions that, in response to being executed at the STA, cause the STA to initiate a receive sector training procedure in response to the determination not to perform directional reception using the reciprocal initiator RX sector.

Example 56 is the at least one non-transitory computer-readable storage medium of Example 55, comprising wireless communication instructions that, in response to being executed at the STA, cause the STA to select the initiator RX sector based on one or more sector sweep frames received during a responder receive sector sweep (RXSS) comprised in the receive sector training procedure.

Example 57 is the at least one non-transitory computer-readable storage medium of Example 54, comprising wireless communication instructions that, in response to being executed at the STA, cause the STA to receive a directional data transmission using a receive antenna pattern corresponding to the selected initiator RX sector.

Example 58 is the at least one non-transitory computer-readable storage medium of Example 46, comprising wireless communication instructions that, in response to being executed at the STA, cause the STA to send a directional reception instruction to instruct a responder to enter a directional reception mode, the directional reception instruction to instruct the responder to enter the directional reception mode following a responder TXSS comprised in a same transmit sector training procedure as the initiator TXSS.

Example 59 is the at least one non-transitory computer-readable storage medium of Example 58, comprising wireless communication instructions that, in response to being executed at the STA, cause the STA to send a grant frame comprising the directional reception instruction.

Example 60 is the at least one non-transitory computer-readable storage medium of Example 59, the directional reception instruction to comprise a value of a designated bit in a beamforming control field of the grant frame.

Example 61 is the at least one non-transitory computer-readable storage medium of Example 59, comprising wireless communication instructions that, in response to being executed at the STA, cause the STA to receive a grant acknowledgment frame in response to the grant frame, the grant acknowledgment frame to contain an acknowledgment of the directional reception instruction.

Example 62 is the at least one non-transitory computer-readable storage medium of Example 61, the acknowledgment of the directional reception instruction to comprise a value of a designated bit in a beamforming control field of the grant acknowledgment frame.

Example 63 is the at least one non-transitory computer-readable storage medium of Example 59, comprising wireless communication instructions that, in response to being executed at the STA, cause the STA to send the grant frame comprising the directional reception instruction following the transmit sector training procedure.

Example 64 is the at least one non-transitory computer-readable storage medium of Example 58, comprising wireless communication instructions that, in response to being executed at the STA, cause the STA to send a sector sweep feedback frame comprising the directional reception instruction.

Example 65 is the at least one non-transitory computer-readable storage medium of Example 64, the directional reception instruction to comprise a value of a designated bit in a sector sweep feedback field of the sector sweep feedback frame.

Example 66 is the at least one non-transitory computer-readable storage medium of Example 64, comprising wireless communication instructions that, in response to being executed at the STA, cause the STA to receive a sector sweep acknowledgment frame in response to the sector sweep feedback frame, the sector sweep acknowledgment frame to contain an acknowledgment of the directional reception instruction.

Example 67 is the at least one non-transitory computer-readable storage medium of Example 66, the acknowledgment of the directional reception instruction to comprise a value of a designated bit in a sector sweep feedback field of the sector sweep acknowledgment frame.

Example 68 is at least one non-transitory computer-readable storage medium comprising a set of wireless communication instructions that, in response to being executed at a station (STA), cause the STA to perform a responder transmit sector sweep (RXSS) to select a responder transmit (TX) sector, enter a directional reception mode using a reciprocal responder receive (RX) sector for the responder TX sector, and determine whether to use the reciprocal responder RX sector for directional data reception based on an outcome of a beamforming reciprocity test.

Example 69 is the at least one non-transitory computer-readable storage medium of Example 68, the beamforming reciprocity test to comprise at least a portion of an initial modulation and coding scheme (MCS) selection exchange.

Example 70 is the at least one non-transitory computer-readable storage medium of Example 68, comprising wireless communication instructions that, in response to being executed at the STA, cause the STA to receive a link measurement request frame and send a link measurement response frame in response to the link measurement request frame during the beamforming reciprocity test.

Example 71 is the at least one non-transitory computer-readable storage medium of Example 70, comprising wireless communication instructions that, in response to being executed at the STA, cause the STA to determine that the beamforming reciprocity test has succeeded based on receipt of a second link measurement response frame in response to the sent link measurement response frame.

Example 72 is the at least one non-transitory computer-readable storage medium of Example 70, comprising wireless communication instructions that, in response to being executed at the STA, cause the STA to determine that the beamforming reciprocity test has failed in response to a determination that no second link measurement response frame has been received in response to the sent link measurement response frame.

Example 73 is the at least one non-transitory computer-readable storage medium of Example 68, comprising wireless communication instructions that, in response to being executed at the STA, cause the STA to in response to a determination that the beamforming reciprocity test has succeeded determine to use the reciprocal responder RX sector for directional data reception, and receive a directional data transmission using a receive antenna pattern corresponding to the reciprocal responder RX sector.

Example 74 is the at least one non-transitory computer-readable storage medium of Example 68, comprising wireless communication instructions that, in response to being executed at the STA, cause the STA to in response to a determination that the beamforming reciprocity test has failed determine not to use the reciprocal responder RX sector for directional data reception, and select a responder RX sector.

Example 75 is the at least one non-transitory computer-readable storage medium of Example 74, comprising wireless communication instructions that, in response to being executed at the STA, cause the STA to select the responder RX sector based on one or more sector sweep frames received during an initiator receive sector sweep (RXSS) of a receive sector training procedure.

Example 76 is the at least one non-transitory computer-readable storage medium of Example 74, comprising wireless communication instructions that, in response to being executed at the STA, cause the STA to receive a directional data transmission using a receive antenna pattern corresponding to the selected responder RX sector.

Example 77 is the at least one non-transitory computer-readable storage medium of Example 68, comprising wireless communication instructions that, in response to being executed at the STA, cause the STA to determine to enter the directional reception mode using the reciprocal responder RX sector based on a received directional reception instruction.

Example 78 is the at least one non-transitory computer-readable storage medium of Example 77, the directional reception instruction to be comprised in a received grant frame.

Example 79 is the at least one non-transitory computer-readable storage medium of Example 78, the directional reception instruction to comprise a value of a designated bit in a beamforming control field of the grant frame.

Example 80 is the at least one non-transitory computer-readable storage medium of Example 77, comprising wireless communication instructions that, in response to being executed at the STA, cause the STA to send a grant acknowledgment frame in response to the grant frame, the grant acknowledgment frame to contain an acknowledgment of the directional reception instruction.

Example 81 is the at least one non-transitory computer-readable storage medium of Example 80, the acknowledgment of the directional reception instruction to comprise a value of a designated bit in a beamforming control field of the grant acknowledgment frame.

Example 82 is the at least one non-transitory computer-readable storage medium of Example 77, the directional reception instruction to be comprised in a received sector sweep feedback frame.

Example 83 is the at least one non-transitory computer-readable storage medium of Example 82, the directional reception instruction to comprise a value of a designated bit in a sector sweep feedback field of the sector sweep feedback frame.

Example 84 is the at least one non-transitory computer-readable storage medium of Example 77, comprising wireless communication instructions that, in response to being executed at the STA, cause the STA to send a sector sweep acknowledgment frame in response to the sector sweep feedback frame, the sector sweep acknowledgment frame to contain an acknowledgment of the directional reception instruction.

Example 85 is the at least one non-transitory computer-readable storage medium of Example 84, the acknowledgment of the directional reception instruction to comprise a value of a designated bit in a sector sweep feedback field of the sector sweep acknowledgment frame.

Example 86 is the at least one non-transitory computer-readable storage medium of Example 68, comprising wireless communication instructions that, in response to being executed at the STA, cause the STA to determine to enter the directional reception mode using the reciprocal responder RX sector based on a value of a bit in directional multi-gigabit (DMG) capability information field of a received management frame.

Example 87 is a wireless communication method, comprising performing, by a station (STA), an initiator transmit sector sweep (TXSS) to select an initiator transmit (TX) sector, performing a beamforming reciprocity test using the selected initiator TX sector, and determining, by processing circuitry of the STA, whether to perform directional reception using a reciprocal initiator receive (RX) sector for the initiator TX sector based on an outcome of the beamforming reciprocity test.

Example 88 is the wireless communication method of Example 87, comprising initiating an initial modulation and coding scheme (MCS) selection exchange comprising the beamforming reciprocity test.

Example 89 is the wireless communication method of Example 87, comprising sending a link measurement request frame during the beamforming reciprocity test.

Example 90 is the wireless communication method of Example 89, comprising directionally transmitting a signal comprising the link measurement request frame using a transmit antenna pattern corresponding to the selected initiator TX sector.

Example 91 is the wireless communication method of Example 89, comprising determining that the beamforming reciprocity test has succeeded based on receipt of a link measurement response frame in response to the link measurement request frame.

Example 92 is the wireless communication method of Example 91, comprising sending a second link measurement response frame in response to the received link measurement response frame.

Example 93 is the wireless communication method of Example 89, comprising determining that the beamforming reciprocity test has failed in response to a determination that no reply to the link measurement request frame has been received.

Example 94 is the wireless communication method of Example 87, comprising in response to a determination that the beamforming reciprocity test has succeeded determining to perform directional reception using the reciprocal initiator RX sector, and receiving a directional data transmission using a receive antenna pattern corresponding to the reciprocal initiator RX sector.

Example 95 is the wireless communication method of Example 87, comprising in response to a determination that the beamforming reciprocity test has failed determining not to perform directional reception using the reciprocal initiator RX sector, and selecting an initiator RX sector.

Example 96 is the wireless communication method of Example 95, comprising initiating a receive sector training procedure in response to the determination not to perform directional reception using the reciprocal initiator RX sector.

Example 97 is the wireless communication method of Example 96, comprising selecting the initiator RX sector based on one or more sector sweep frames received during a responder receive sector sweep (RXSS) comprised in the receive sector training procedure.

Example 98 is the wireless communication method of Example 95, comprising receiving a directional data transmission using a receive antenna pattern corresponding to the selected initiator RX sector.

Example 99 is the wireless communication method of Example 87, comprising sending a directional reception instruction to instruct a responder to enter a directional reception mode, the directional reception instruction to instruct the responder to enter the directional reception mode following a responder TXSS comprised in a same transmit sector training procedure as the initiator TXSS.

Example 100 is the wireless communication method of Example 99, comprising sending a grant frame comprising the directional reception instruction.

Example 101 is the wireless communication method of Example 100, the directional reception instruction to comprise a value of a designated bit in a beamforming control field of the grant frame.

Example 102 is the wireless communication method of Example 100, comprising receiving a grant acknowledgment frame in response to the grant frame, the grant acknowledgment frame to contain an acknowledgment of the directional reception instruction.

Example 103 is the wireless communication method of Example 102, the acknowledgment of the directional reception instruction to comprise a value of a designated bit in a beamforming control field of the grant acknowledgment frame.

Example 104 is the wireless communication method of Example 100, comprising sending the grant frame comprising the directional reception instruction following the transmit sector training procedure.

Example 105 is the wireless communication method of Example 99, comprising sending a sector sweep feedback frame comprising the directional reception instruction.

Example 106 is the wireless communication method of Example 105, the directional reception instruction to comprise a value of a designated bit in a sector sweep feedback field of the sector sweep feedback frame.

Example 107 is the wireless communication method of Example 105, comprising receiving a sector sweep acknowledgment frame in response to the sector sweep feedback frame, the sector sweep acknowledgment frame to contain an acknowledgment of the directional reception instruction.

Example 108 is the wireless communication method of Example 107, the acknowledgment of the directional reception instruction to comprise a value of a designated bit in a sector sweep feedback field of the sector sweep acknowledgment frame.

Example 109 is at least one non-transitory computer-readable storage medium comprising a set of instructions that, in response to being executed on a computing device, cause the computing device to perform a wireless communication method according to any of Examples 87 to 108.

Example 110 is an apparatus, comprising means for performing a wireless communication method according to any of Examples 87 to 108.

Example 111 is a system, comprising the apparatus of Example 110, at least one radio frequency (RF) transceiver, and at least one RF antenna.

Example 112 is the system of Example 111, comprising a touchscreen display.

Example 113 is a wireless communication method, comprising performing, by a station (STA), a responder transmit sector sweep (RXSS) to select a responder transmit (TX) sector, entering a directional reception mode using a reciprocal responder receive (RX) sector for the responder TX sector, and determining, by processing circuitry of the STA, whether to use the reciprocal responder RX sector for directional data reception based on an outcome of a beamforming reciprocity test.

Example 114 is the wireless communication method of Example 113, the beamforming reciprocity test to comprise at least a portion of an initial modulation and coding scheme (MCS) selection exchange.

Example 115 is the wireless communication method of Example 113, comprising receiving a link measurement request frame and send a link measurement response frame in response to the link measurement request frame during the beamforming reciprocity test.

Example 116 is the wireless communication method of Example 115, comprising determining that the beamforming reciprocity test has succeeded based on receipt of a second link measurement response frame in response to the sent link measurement response frame.

Example 117 is the wireless communication method of Example 115, comprising determining that the beamforming reciprocity test has failed in response to a determination that no second link measurement response frame has been received in response to the sent link measurement response frame.

Example 118 is the wireless communication method of Example 113, comprising in response to a determination that the beamforming reciprocity test has succeeded determining to use the reciprocal responder RX sector for directional data reception, and receiving a directional data transmission using a receive antenna pattern corresponding to the reciprocal responder RX sector.

Example 119 is the wireless communication method of Example 113, comprising in response to a determination that the beamforming reciprocity test has failed determining not to use the reciprocal responder RX sector for directional data reception, and selecting a responder RX sector.

Example 120 is the wireless communication method of Example 119, comprising selecting the responder RX sector based on one or more sector sweep frames received during an initiator receive sector sweep (RXSS) of a receive sector training procedure.

Example 121 is the wireless communication method of Example 119, comprising receiving a directional data transmission using a receive antenna pattern corresponding to the selected responder RX sector.

Example 122 is the wireless communication method of Example 113, comprising determining to enter the directional reception mode using the reciprocal responder RX sector based on a received directional reception instruction.

Example 123 is the wireless communication method of Example 122, the directional reception instruction to be comprised in a received grant frame.

Example 124 is the wireless communication method of Example 123, the directional reception instruction to comprise a value of a designated bit in a beamforming control field of the grant frame.

Example 125 is the wireless communication method of Example 122, comprising sending a grant acknowledgment frame in response to the grant frame, the grant acknowledgment frame to contain an acknowledgment of the directional reception instruction.

Example 126 is the wireless communication method of Example 125, the acknowledgment of the directional reception instruction to comprise a value of a designated bit in a beamforming control field of the grant acknowledgment frame.

Example 127 is the wireless communication method of Example 122, the directional reception instruction to be comprised in a received sector sweep feedback frame.

Example 128 is the wireless communication method of Example 127, the directional reception instruction to comprise a value of a designated bit in a sector sweep feedback field of the sector sweep feedback frame.

Example 129 is the wireless communication method of Example 122, comprising sending a sector sweep acknowledgment frame in response to the sector sweep feedback frame, the sector sweep acknowledgment frame to contain an acknowledgment of the directional reception instruction.

Example 130 is the wireless communication method of Example 129, the acknowledgment of the directional reception instruction to comprise a value of a designated bit in a sector sweep feedback field of the sector sweep acknowledgment frame.

Example 131 is the wireless communication method of Example 113, comprising determining to enter the directional reception mode using the reciprocal responder RX sector based on a value of a bit in directional multi-gigabit (DMG) capability information field of a received management frame.

Example 132 is at least one non-transitory computer-readable storage medium comprising a set of instructions that, in response to being executed on a computing device, cause the computing device to perform a wireless communication method according to any of Examples 113 to 131.

Example 133 is an apparatus, comprising means for performing a wireless communication method according to any of Examples 113 to 131.

Example 134 is a system, comprising the apparatus of Example 133, at least one radio frequency (RF) transceiver, and at least one RF antenna.

Example 135 is the system of Example 134, comprising a touchscreen display.

Example 136 is a wireless communication apparatus, comprising means for performing, by a station (STA), an initiator transmit sector sweep (TXSS) to select an initiator transmit (TX) sector, means for performing a beamforming reciprocity test using the selected initiator TX sector, and means for determining whether to perform directional reception using a reciprocal initiator receive (RX) sector for the initiator TX sector based on an outcome of the beamforming reciprocity test.

Example 137 is the wireless communication apparatus of Example 136, comprising means for initiating an initial modulation and coding scheme (MCS) selection exchange comprising the beamforming reciprocity test.

Example 138 is the wireless communication apparatus of Example 136, comprising means for sending a link measurement request frame during the beamforming reciprocity test.

Example 139 is the wireless communication apparatus of Example 138, comprising means for directionally transmitting a signal comprising the link measurement request frame using a transmit antenna pattern corresponding to the selected initiator TX sector.

Example 140 is the wireless communication apparatus of Example 138, comprising means for determining that the beamforming reciprocity test has succeeded based on receipt of a link measurement response frame in response to the link measurement request frame.

Example 141 is the wireless communication apparatus of Example 140, comprising means for sending a second link measurement response frame in response to the received link measurement response frame.

Example 142 is the wireless communication apparatus of Example 138, comprising means for determining that the beamforming reciprocity test has failed in response to a determination that no reply to the link measurement request frame has been received.

Example 143 is the wireless communication apparatus of Example 136, comprising means for, in response to a determination that the beamforming reciprocity test has succeeded determining to perform directional reception using the reciprocal initiator RX sector, and receiving a directional data transmission using a receive antenna pattern corresponding to the reciprocal initiator RX sector.

Example 144 is the wireless communication apparatus of Example 136, comprising means for, in response to a determination that the beamforming reciprocity test has failed determining not to perform directional reception using the reciprocal initiator RX sector, and selecting an initiator RX sector.

Example 145 is the wireless communication apparatus of Example 144, comprising means for initiating a receive sector training procedure in response to the determination not to perform directional reception using the reciprocal initiator RX sector.

Example 146 is the wireless communication apparatus of Example 145, comprising means for selecting the initiator RX sector based on one or more sector sweep frames received during a responder receive sector sweep (RXSS) comprised in the receive sector training procedure.

Example 147 is the wireless communication apparatus of Example 144, comprising means for receiving a directional data transmission using a receive antenna pattern corresponding to the selected initiator RX sector.

Example 148 is the wireless communication apparatus of Example 136, comprising means for sending a directional reception instruction to instruct a responder to enter a directional reception mode, the directional reception instruction to instruct the responder to enter the directional reception mode following a responder TXSS comprised in a same transmit sector training procedure as the initiator TXSS.

Example 149 is the wireless communication apparatus of Example 148, comprising means for sending a grant frame comprising the directional reception instruction.

Example 150 is the wireless communication apparatus of Example 149, the directional reception instruction to comprise a value of a designated bit in a beamforming control field of the grant frame.

Example 151 is the wireless communication apparatus of Example 149, comprising means for receiving a grant acknowledgment frame in response to the grant frame, the grant acknowledgment frame to contain an acknowledgment of the directional reception instruction.

Example 152 is the wireless communication apparatus of Example 151, the acknowledgment of the directional reception instruction to comprise a value of a designated bit in a beamforming control field of the grant acknowledgment frame.

Example 153 is the wireless communication apparatus of Example 149, comprising means for sending the grant frame comprising the directional reception instruction following the transmit sector training procedure.

Example 154 is the wireless communication apparatus of Example 148, comprising means for sending a sector sweep feedback frame comprising the directional reception instruction.

Example 155 is the wireless communication apparatus of Example 154, the directional reception instruction to comprise a value of a designated bit in a sector sweep feedback field of the sector sweep feedback frame.

Example 156 is the wireless communication apparatus of Example 154, comprising means for receiving a sector sweep acknowledgment frame in response to the sector sweep feedback frame, the sector sweep acknowledgment frame to contain an acknowledgment of the directional reception instruction.

Example 157 is the wireless communication apparatus of Example 156, the acknowledgment of the directional reception instruction to comprise a value of a designated bit in a sector sweep feedback field of the sector sweep acknowledgment frame.

Example 158 is a system, comprising an apparatus according to any of Examples 136 to 157, at least one radio frequency (RF) transceiver, and at least one RF antenna.

Example 159 is the system of Example 158, comprising a touchscreen display.

Example 160 is a wireless communication apparatus, comprising means for performing, by a station (STA), a responder transmit sector sweep (RXSS) to select a responder transmit (TX) sector, means for entering a directional reception mode using a reciprocal responder receive (RX) sector for the responder TX sector, and means for determining whether to use the reciprocal responder RX sector for directional data reception based on an outcome of a beamforming reciprocity test.

Example 161 is the wireless communication apparatus of Example 160, the beamforming reciprocity test to comprise at least a portion of an initial modulation and coding scheme (MCS) selection exchange.

Example 162 is the wireless communication apparatus of Example 160, comprising means for receiving a link measurement request frame and send a link measurement response frame in response to the link measurement request frame during the beamforming reciprocity test.

Example 163 is the wireless communication apparatus of Example 162, comprising means for determining that the beamforming reciprocity test has succeeded based on receipt of a second link measurement response frame in response to the sent link measurement response frame.

Example 164 is the wireless communication apparatus of Example 162, comprising means for determining that the beamforming reciprocity test has failed in response to a determination that no second link measurement response frame has been received in response to the sent link measurement response frame.

Example 165 is the wireless communication apparatus of Example 160, comprising means for, in response to a determination that the beamforming reciprocity test has succeeded determining to use the reciprocal responder RX sector for directional data reception, and receiving a directional data transmission using a receive antenna pattern corresponding to the reciprocal responder RX sector.

Example 166 is the wireless communication apparatus of Example 160, comprising means for, in response to a determination that the beamforming reciprocity test has failed determining not to use the reciprocal responder RX sector for directional data reception, and selecting a responder RX sector.

Example 167 is the wireless communication apparatus of Example 166, comprising means for selecting the responder RX sector based on one or more sector sweep frames received during an initiator receive sector sweep (RXSS) of a receive sector training procedure.

Example 168 is the wireless communication apparatus of Example 166, comprising means for receiving a directional data transmission using a receive antenna pattern corresponding to the selected responder RX sector.

Example 169 is the wireless communication apparatus of Example 160, comprising means for determining to enter the directional reception mode using the reciprocal responder RX sector based on a received directional reception instruction.

Example 170 is the wireless communication apparatus of Example 169, the directional reception instruction to be comprised in a received grant frame.

Example 171 is the wireless communication apparatus of Example 170, the directional reception instruction to comprise a value of a designated bit in a beamforming control field of the grant frame.

Example 172 is the wireless communication apparatus of Example 169, comprising means for sending a grant acknowledgment frame in response to the grant frame, the grant acknowledgment frame to contain an acknowledgment of the directional reception instruction.

Example 173 is the wireless communication apparatus of Example 172, the acknowledgment of the directional reception instruction to comprise a value of a designated bit in a beamforming control field of the grant acknowledgment frame.

Example 174 is the wireless communication apparatus of Example 169, the directional reception instruction to be comprised in a received sector sweep feedback frame.

Example 175 is the wireless communication apparatus of Example 174, the directional reception instruction to comprise a value of a designated bit in a sector sweep feedback field of the sector sweep feedback frame.

Example 176 is the wireless communication apparatus of Example 169, comprising means for sending a sector sweep acknowledgment frame in response to the sector sweep feedback frame, the sector sweep acknowledgment frame to contain an acknowledgment of the directional reception instruction.

Example 177 is the wireless communication apparatus of Example 176, the acknowledgment of the directional reception instruction to comprise a value of a designated bit in a sector sweep feedback field of the sector sweep acknowledgment frame.

Example 178 is the wireless communication apparatus of Example 160, comprising means for determining to enter the directional reception mode using the reciprocal responder RX sector based on a value of a bit in directional multi-gigabit (DMG) capability information field of a received management frame.

Example 179 is a system, comprising an apparatus according to any of Examples 160 to 178, at least one radio frequency (RF) transceiver, and at least one RF antenna.

Example 180 is the system of Example 179, comprising a touchscreen display.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
a station (STA) comprising logic, at least a portion of which is in hardware, the logic to:
perform an initiator transmit sector sweep (TXSS) to select an initiator transmit (TX) sector,
perform a beamforming reciprocity test using the selected initiator TX sector, the beamforming reciprocity test including an initial modulation and coding scheme (MCS) selection exchange, and
determine whether to perform directional reception using a reciprocal initiator receive (RX) sector for the initiator TX sector based on an outcome of the beamforming reciprocity test, and
determine to perform directional reception using the reciprocal initiator RX sector and cause a directional data transmission to be received using a receive antenna pattern corresponding to the reciprocal initiator RX sector in response to the determination that the beamforming reciprocity test has succeeded.

2. The apparatus of claim 1, the logic to send a link measurement request frame during the initial MCS selection exchange.

3. The apparatus of claim 2, the logic to determine that the beamforming reciprocity test has succeeded based on receipt of a link measurement response frame in response to the link measurement request frame.

4. The apparatus of claim 1, the logic to determine not to perform directional reception using the reciprocal initiator RX sector and select an initiator RX sector in response to a determination that the beamforming reciprocity test has failed.

5. The apparatus of claim 4, the logic to initiate a receive sector training procedure in response to the determination not to perform directional reception using the reciprocal initiator RX sector, select the initiator RX sector based on one or more sector sweep frames received during a responder receive sector sweep (RXSS) comprised in the receive sector training procedure, and cause a directional data transmission to be received using a receive antenna pattern corresponding to the selected initiator RX sector.

6. The apparatus of claim 4, the logic to initiate a beam refinement procedure in response to the determination not to perform directional reception using the reciprocal initiator RX sector, select the initiator RX sector according to a result of the beam refinement procedure, and cause a directional data transmission to be received using a receive antenna pattern corresponding to the selected initiator RX sector.

7. The apparatus of claim 1, comprising:
at least one radio frequency (RF) transceiver; and
at least one RF antenna.

8. At least one non-transitory computer-readable storage medium comprising a set of instructions that, in response to being executed at a station (STA), cause the STA to:
perform an initiator transmit sector sweep (TXSS) to select an initiator transmit (TX) sector;
perform a beamforming reciprocity test using the selected initiator TX sector, the beamforming reciprocity test including an initial modulation and coding scheme (MCS) selection exchange;
determine whether to perform directional reception using a reciprocal initiator receive (RX) sector for the initiator TX sector based on an outcome of the beamforming reciprocity test; and
determine whether to perform directional reception using the reciprocal initiator RX sector and cause a directional data transmission to be received using a receive antenna pattern corresponding to the reciprocal initiator RX sector in response to a determination that the beamforming reciprocity test has succeeded.

9. The at least one non-transitory computer-readable storage medium of claim 8, comprising instructions that, in response to being executed at the STA, cause the STA to:
in response to a determination that the beamforming reciprocity test has failed:
determine not to perform directional reception using the reciprocal initiator RX sector; and
select an initiator RX sector.

10. The at least one non-transitory computer-readable storage medium of claim 8, comprising instructions that, in response to being executed at the STA, cause the STA to send a directional reception instruction to instruct a responder to enter a directional reception mode, the directional reception instruction to instruct the responder to enter the directional reception mode following a responder TXSS comprised in a same transmit sector training procedure as the initiator TXSS.

11. The at least one non-transitory computer-readable storage medium of claim 10, comprising instructions that, in response to being executed at the STA, cause the STA to send a grant frame comprising the directional reception instruction.

12. The at least one non-transitory computer-readable storage medium of claim 11, comprising instructions that, in response to being executed at the STA, cause the STA to send the grant frame comprising the directional reception instruction following the transmit sector training procedure.

13. The at least one non-transitory computer-readable storage medium of claim 10, comprising instructions that, in response to being executed at the STA, cause the STA to send a sector sweep feedback frame comprising the directional reception instruction.

14. The at least one non-transitory computer-readable storage medium of claim 10, comprising instructions that, in response to being executed at the STA, cause the STA to:
send a first frame comprising the directional reception instruction; and
receive a second frame comprising an acknowledgment of the directional reception instruction, the directional reception instruction to comprise a value of a designated bit in a field of the first frame, the acknowledgment of the directional reception instruction to comprise a value of a corresponding designated bit in a field of the second frame.

* * * * *